United States Patent [19]
Kiyanagi et al.

[11] Patent Number: 6,029,056
[45] Date of Patent: Feb. 22, 2000

[54] SPACE DIVERSITY RECEIVING APPARATUS

[75] Inventors: Hiroyuki Kiyanagi; Yasuhiro Shibuya, both of Sendai; Takanori Iwamatsu, Kawasaki; Toshiaki Suzuki, Sendai, all of Japan

[73] Assignee: Fujitsu Limited, Kanagawa, Japan

[21] Appl. No.: 08/962,054

[22] Filed: Oct. 31, 1997

[30]   Foreign Application Priority Data

May 19, 1997  [JP]  Japan .................................. 9-128355

[51] Int. Cl.[7] ...................................................... H04B 1/06
[52] U.S. Cl. ...................... 455/276.1; 455/273; 455/137; 455/139
[58] Field of Search ................................ 455/276.1, 273, 455/236.1, 137, 139; 375/346, 347, 349

[56]       References Cited

U.S. PATENT DOCUMENTS

| 4,326,294 | 4/1982 | Okamoto et al. .................... 455/276.1 |
| 4,805,229 | 2/1989 | Mobley .................................... 455/137 |
| 5,203,029 | 4/1993 | Betzl et al. ............................. 455/137 |
| 5,345,603 | 9/1994 | Laffont ................................. 455/276.1 |
| 5,448,602 | 9/1995 | Ohmori et al. .......................... 375/347 |
| 5,530,925 | 6/1996 | Garner .................................... 455/273 |

Primary Examiner—Dwayne D. Bost
Assistant Examiner—Quochien B. Vuong
Attorney, Agent, or Firm—Helfgott & Karas, P.C.

[57]       ABSTRACT

A space diversity receiver apparatus receives signals by two spatially separated antennas, controls the phase of the signal received by one of the antennas by a phase control circuit, combines the phase-controlled signal and the signal received by the other antenna by a combiner and outputs the combined signal. A digital detector digitally detects the center frequency level and the levels on high- and low-frequency sides of the center frequency of the combined signal. Phase is controlled in such a manner that the center frequency level will coincide with a set level and a deviation between the levels on the high- and low-frequency sides of the center frequency will become zero.

13 Claims, 23 Drawing Sheets

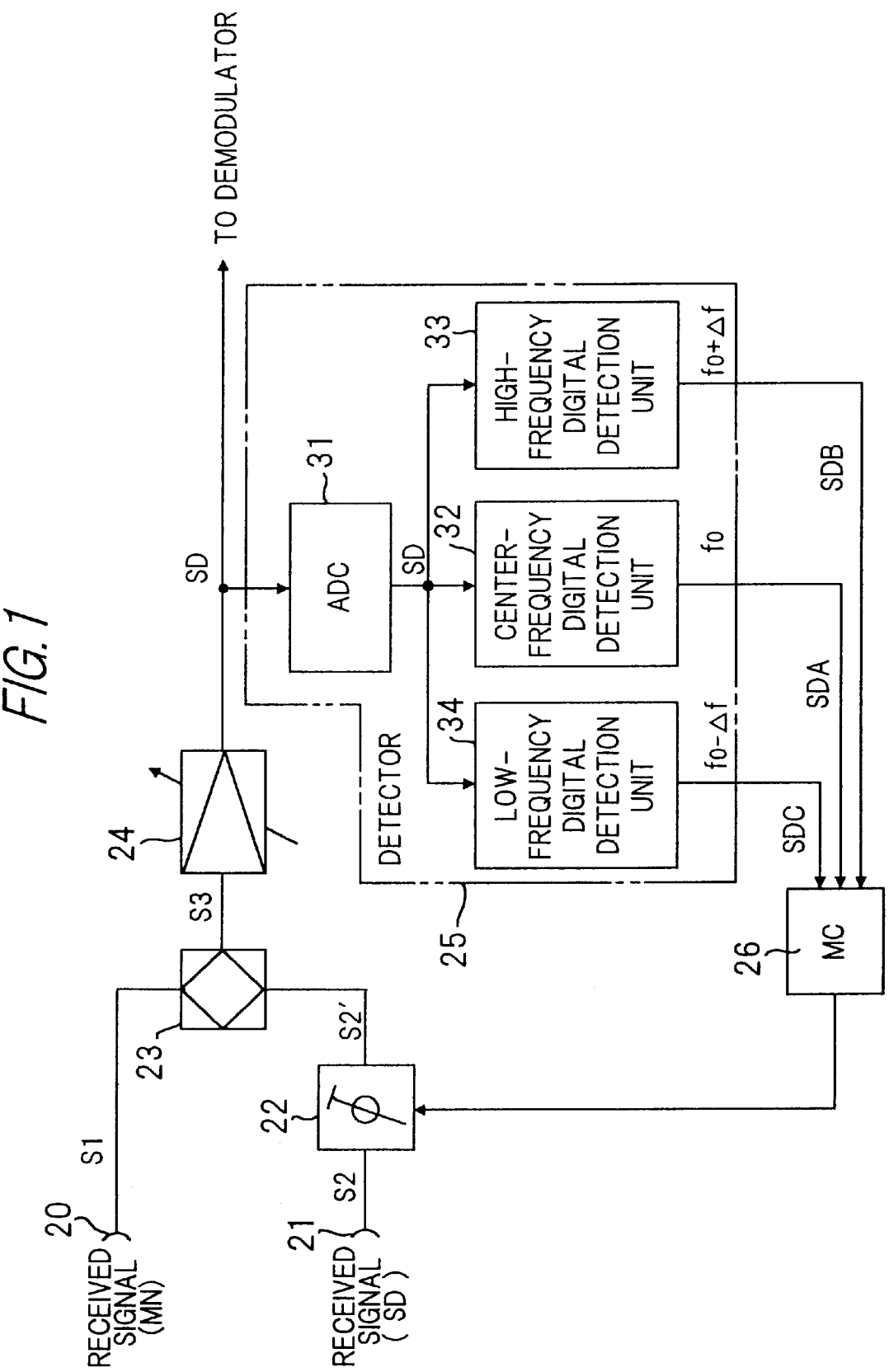

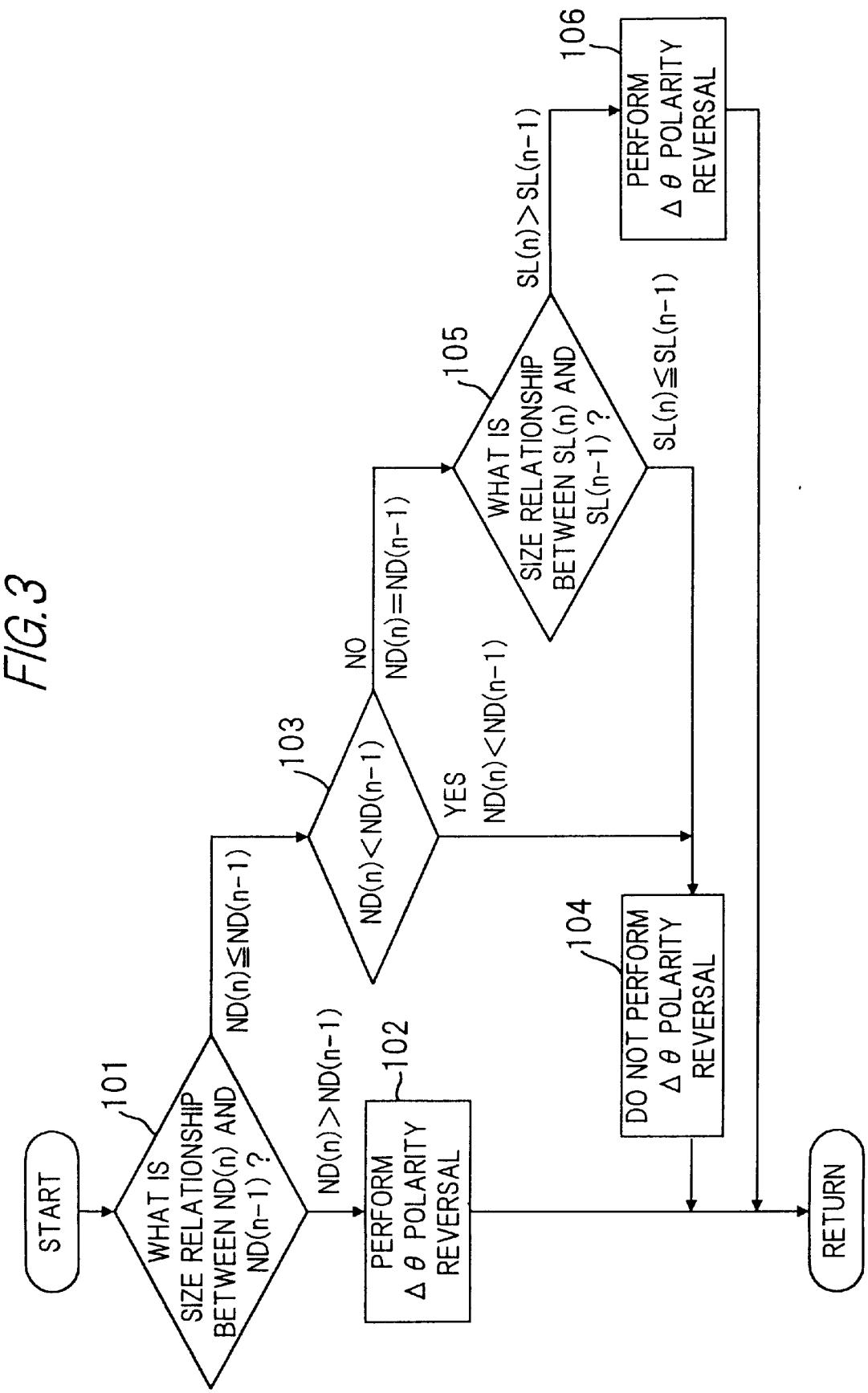

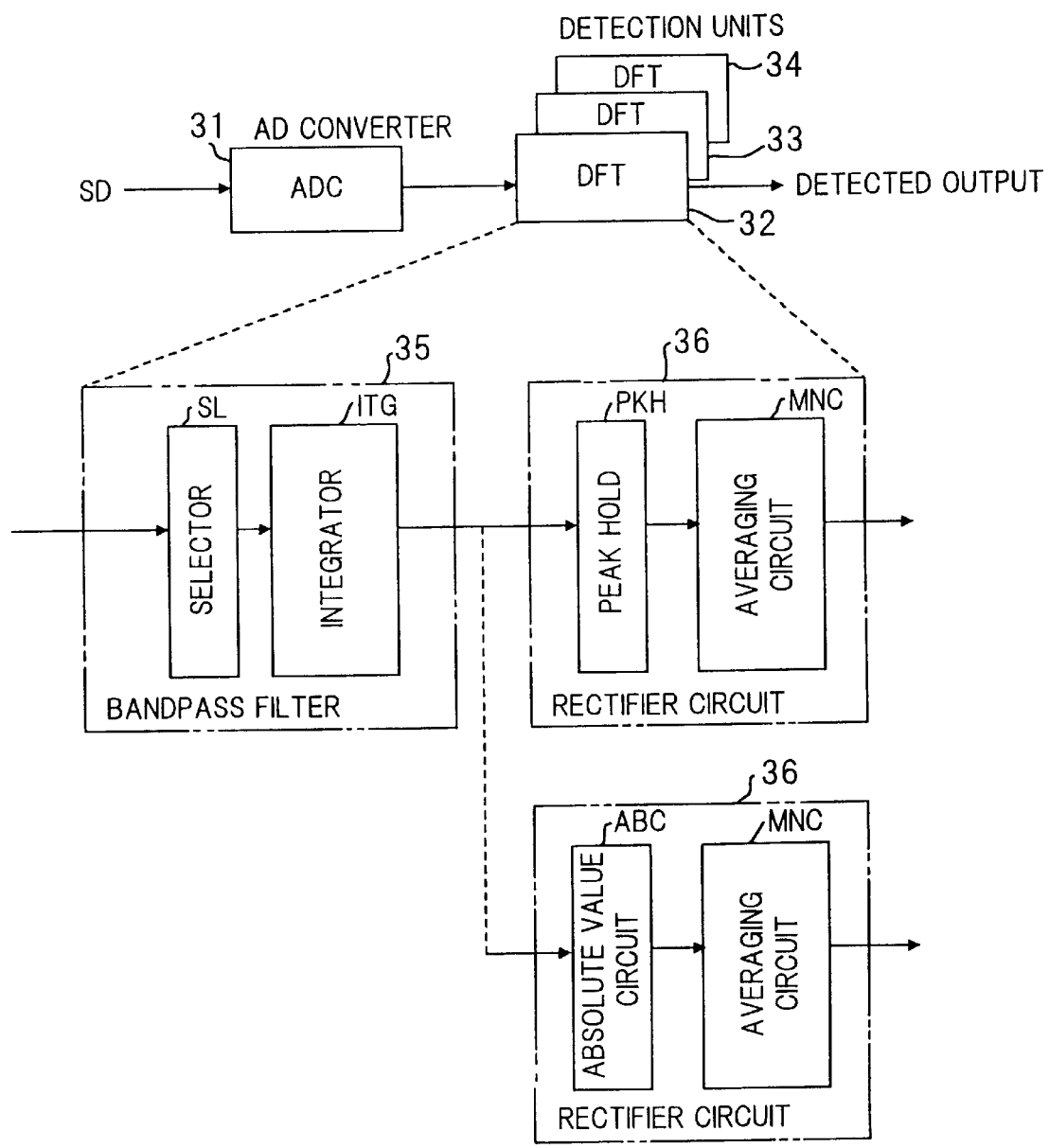

FIG. 18
(a)
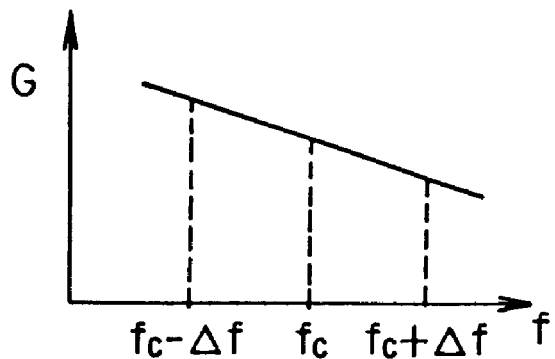
(b)
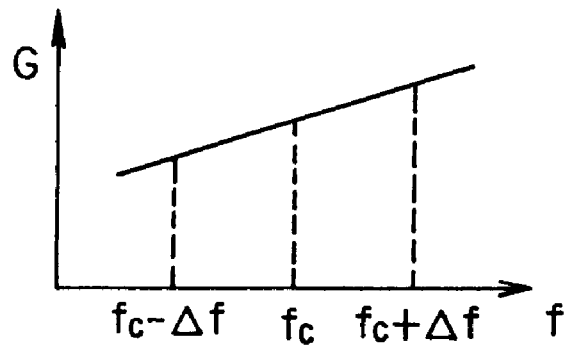
(c)
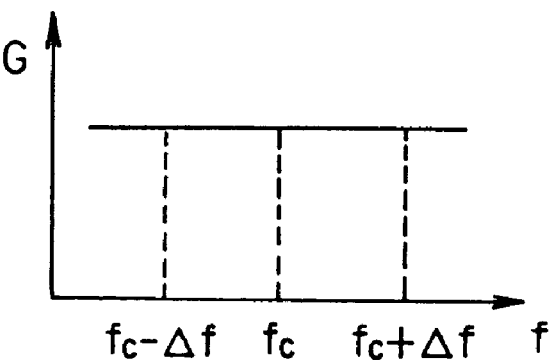

SPACE DIVERSITY RECEIVING APPARATUS

BACKGROUND OF THE INVENTION

This invention relates to a space diversity receiver apparatus and, more particularly, to a space diversity receiver apparatus for receiving signals by two spatially separated antennas, controlling the phase of the signal received by one of the antennas, and combining the phase-controlled signal and the signal received by the other antenna, thereby reducing the effects of fading produced by a wireless communication medium.

The frequency of occurrence, depth and time of occurrence of fading which occurs in a wireless communication medium differ depending upon the location at which the receiving antenna is installed. In space diversity reception, this property is utilized by placing two antennas at positions having little fading correlation and either combining the signals received by the two antennas or switching between the two signals to reduce fading.

FIG. 20 is a diagram showing the construction of a conventional space diversity receiver apparatus of the type which applies a minimum amplitude deviation method. The apparatus includes intermediate frequency output units 10a, 10b which output intermediate frequency signals S1, S2, respectively, obtained from reception signals of first and second antennas (not shown) by high-frequency amplification, frequency conversion and intermediate frequency amplification, a phase control circuit 11 for controlling the phase of the intermediate frequency signal S2, a combiner 12 for combining the intermediate frequency signal S1 and an output signal S2' of the phase control circuit 11, an AGC circuit 13 for compressing output level, an analog detector 14 for detecting the signal levels of three frequencies (center frequency $f_0$, high-side frequency $f_0+\Delta f$ and low-side frequency $f-\Delta f$) in the intermediate frequency band, an AD converter 15 for converting the signal levels of these frequencies to digital values, and a controller 16 of microcontroller construction for exercising control so as to flatten the frequency characteristic in the intermediate frequency band. There are cases where the frequency characteristic in the intermediate frequency band is flat (FIG. 21A), increasing (FIG. 21B) or decreasing (FIG. 21C). The controller 16 performs phase control in such a manner that the frequency characteristics of FIGS. 21B and 21C will become the frequency characteristic shown in FIG. 21A.

The detector 14 has first through third detectors 14a–14c for detecting and outputting the signal levels of the three frequencies, namely the low-side frequency $f_0-\Delta f$, center frequency $f_0$ and high-side frequency $f_0+\Delta f$, respectively. The AD converter 15 has first through third AD converters 15a–15c for converting the outputs of the first through detectors 14a–14c, respectively, to digital signals.

Each of the detectors 14a–14c has the construction shown in FIG. 22. Specifically, a bandpass filter BPF passes one of the frequency components $f_0-\Delta f$ (low side), $f_0$ (center) and $f_0+\Delta f$ (high side). The bandpass filter BPF is constituted by an already existing printed-board filter or by such elements as a coil, capacitor and resistor mounted on a printed circuit board. A rectifier circuit RCF, which rectifies the output signal of the bandpass filter BPF, is obtained by mounting diodes or the like on a printed circuit board. A low-pass filter LPF averages the output signal of the rectifier circuit RCF and outputs the average. An operational amplifier OPA amplifies the output of the low-pass filter LPF and outputs the detected voltage. Thus, the bandpass filter BPF extracts and outputs the desired frequency component from the intermediate frequency signal, the rectifier circuit RCF rectifies the desired frequency component extracted by the bandpass filter BPF, the low-pass filter LPF averages and delivers the output signal of the rectifier circuit RCF, and the operational amplifier OPA amplifies the average voltage signal and outputs the detected voltage.

In the space diversity receiver apparatus of FIG. 20, the phase control circuit 11 controls the phase of the received signal S2. The combiner 12 combines like phases of the received signal S1 and phase-controlled signal S2' and outputs a signal S3 via the AGC circuit 13. The detector 14 detects and outputs the signal levels of the three frequencies (center frequency $f_0$, high-side frequency $f_0+\Delta f$ and low-side frequency $f_0-\Delta f$) in the intermediate frequency band, and the AD converter 15 converts the signal levels of these frequencies to digital values and outputs the digital values. The controller 16 controls the phase of the signal S2 in such a manner that an amplitude deviation among these frequencies is eliminated. Repeating the operation described above flattens the frequency characteristic in the intermediate frequency band. That is, by virtue of the above-described operation, the phases of the interference components of the received signals S1, S2 are mutually shifted by $\pi$ and the signals are then combined, thereby canceling out the interference components so that the signal S3, which influenced little by interference, can be obtained as an output.

FIG. 23 is a diagram useful in describing the minimum amplitude deviation method. The received signals S1 and S2 are the results of combining direct waves (indicated by the fine solid lines) and interference waves (the dashed lines) caused by fading. With the minimum amplitude deviation method, the phase of the received signal S2 is controlled so that the phase difference between the interference wave S2b of the received signal S2 and the interference wave S1b of the received signal S1 becomes $\pi$, after which the two signals are combined and delivered as an output. In accordance with the minimum amplitude deviation method, interference components are canceled to make it possible to output the signal S3, which exhibits little interference.

With this space diversity receiver according to the prior art, the detector basically is a circuit on which analog components are mounted. A problem which arises is the space required for the large mounting area.

Further, since the conventional detector is of analog construction, elements exhibit variance in terms of pass loss in the bandpass filter, the rectifying characteristic of the rectifier circuit and pass loss in the low-pass filter. The problem which arises is that the output value of the detected voltage must be standardized. Standardization means applying a correction in such a manner that the detected voltage output will take on an already set value when an intermediate frequency input signal has a certain fixed value.

An additional problem is that the conventional analog detector must be provided with compensating circuits to compensate for temperature and fluctuations in power supply.

Further, in a space diversity receiver of the type which applies the minimum amplitude deviation method, the detection time of the detector is strongly related to control speed. In the conventional analog detector, the delay time possessed by the rectifier circuit is large and it is necessary to convert a plurality of frequency components from analog to digital quantities. Consequently, detection time cannot be shortened and faster phase control cannot be achieved.

Further, a space diversity receiver of the type which applies the minimum amplitude deviation method is not effective if the difference between the reception levels of the two antennas is too large. Conventionally, phase control based upon the minimum amplitude deviation method is performed even if this is the case. This means that when one of the signal levels recovers to thereby reduce the level difference between the received signals from the two antennas, the combined signal level cannot be enlarged immediately.

Further, with the space diversity receiver of the type which applies the minimum amplitude deviation method, opposite phases of the interference components of the two received waves are combined. As a result, a deviation in amplitude can be reduced. However, depending upon the phase relationship between the direct wave and interference wave, combined power also declines when the amplitude deviation is minimized. This degrades the C/N ratio. In addition, code error rate is degraded by thermal noise.

Further, with the space diversity receiver of the type which applies the minimum amplitude deviation method, accurate phase control cannot be carried out owing to a variance in the amplitude deviation characteristic of the analog circuitry provided in the path of the antenna output.

SUMMARY OF THE INVENTION

Accordingly, an object of the present invention is to provide a space diversity receiver apparatus which does not require circuit adjustments, makes possible higher density mounting and operates stably.

Another object of the present invention is to provide a space diversity receiver apparatus in which phase control can be performed at high speed.

A further object of the present invention is to improve upon degradation of C/N ratio and code error rate by terminating phase control based upon the minimum amplitude deviation method and instead performing phase control so as to maximize combined signal level when the level difference between two antenna reception signals becomes too large or when combined signal level becomes too small.

A further object of the present invention is to broaden the dynamic range of antenna reception-signal level to which phase control based upon the minimum amplitude deviation method can be applied.

Still another object of the present invention is to perform accurate phase control by eliminating variance in the amplitude deviation characteristic of the analog circuitry.

According to the present invention, the foregoing objects are attained by providing a space diversity receiver apparatus for receiving signals by two spatially separated antennas, controlling the phase of the signal received by one of the antennas, combining the phase-controlled signal and the signal received by the other antenna and outputting the combined signal, comprising digital detecting means for digitally detecting center frequency level of the combined signal and levels on the high-frequency side and low-frequency side of the center frequency, and phase control means for controlling the phase in such a manner that the center frequency level will coincide with a set level and a deviation between the levels of the high- and low-frequency sides of the center frequency will become zero.

In the space diversity receiver apparatus, the digital detecting means includes an AD converter for sampling the combined signal at a frequency which is n times a center frequency signal of the combined signal and converting the combined signal from an analog quantity to digital data, and digital detectors for digitally detecting center frequency component, high-frequency side component and low-frequency side component using digital data output by the AD converter, the digital detector each being constituted by a digital bandpass filter for outputting each frequency component, and a digital rectifier circuit.

By thus constructing the detector of digital components, it is possible to eliminate circuit adjustments, raise mounting density, achieve stable operation and raise the speed of phase control.

Further, an arrangement may be adopted in which a parallel/serial converter is provided between the digital detecting means and phase control means, wherein the parallel/serial converter converts level deviations between the center frequency level and the levels of the high- and low-frequency sides from parallel data to serial data and enters the serial data into the phase control means as a bit serial. If this arrangement is adopted, the number of data communication lines can be reduced greatly and the interface can be simplified.

Further, in accordance with the present invention, the foregoing objects can be attained by (1) obtaining the difference between reception signal levels of two antennas, executing phase control based upon a minimum amplitude deviation method if the difference between the signal levels is less than a set level, and executing phase control so as to maximize the combined signal level if the difference between the signal levels is equal to or greater than the set level, or (2) monitoring the combined signal level, executing phase control based upon the minimum amplitude deviation method if the combined signal level is equal to or greater than a set level, and executing phase control so as to maximize the combined signal level if the combined signal level is less than the set level. When the level difference between the two antenna reception signals becomes large, or when the combined signal level becomes small, phase control based upon the minimum amplitude deviation method is halted and, in its place, phase control is performed so as to maximize the combined signal level. This makes it possible to improve upon degradation of C/N ratio and code error rate. Further, by providing an AGC circuit which subjects the antenna reception signal to AGC control so as to compress the output level, it is possible to broaden the dynamic range of antenna reception-signal level to which phase control based upon the minimum amplitude deviation method can be applied.

Further, in accordance with the present invention, the foregoing objects can be attained by providing each antenna output path with amplitude equalizing means for controlling the frequency characteristic of the intermediate frequency band, wherein the amplitude equalizing means provided in one antenna output path is adjusted, in a state in which the other antenna output has been made zero, in such a manner that a deviation in the levels between the sides of high and low frequency becomes zero. Thus, amplitude equalizing means is provided and is adjusted in advance in such a manner that an initial amplitude deviation in the main signal system of the receiver becomes zero based upon amplitude deviation information obtained by the detector. This makes it possible to perform accurate phase control by eliminating variance in the amplitude characteristic of the analog circuitry.

Other features and advantages of the present invention will be apparent from the following description taken in conjunction with the accompanying drawings.

BRIEF DESCRIPTION OF THE DRAWINGS

FIG. 1 is a block diagram illustrating a space diversity receiver apparatus according to a first embodiment of the present invention;

FIG. 3 is a flowchart of phase control processing;

FIG. 4 is a block diagram of a detector;

FIG. 18 is a diagram useful in describing a reduction in the variance of an amplitude deviation characteristic by the amplitude equalizer;

DESCRIPTION OF THE PREFERRED EMBODIMENTS (A) First embodiment of the invention (a) Overall configuration FIG. 1 is a block diagram illustrating a space diversity receiver apparatus according to a first embodiment of the present invention. The apparatus includes intermediate frequency output units 20, 21 which output intermediate frequency signals S1, S2, respectively, obtained from reception signals of first and second antennas (not shown) by high-frequency amplification, frequency conversion and intermediate frequency amplification, a phase control circuit 22 for controlling the phase of the intermediate frequency signal S2, a combiner 23 for combining the intermediate frequency signal S1 and an output signal S2' of the phase control circuit 23, an AGC circuit 24 for compressing output level, a digital detector 25 for detecting a combined signal level at three frequencies (center frequency $f_0$, high-side frequency $f_0+\Delta f$ and low-side frequency $f_0-\Delta f$) in the intermediate frequency band, and a controller 26 of microcontroller construction for exercising control so as to flatten the frequency characteristic in the intermediate frequency band. There are cases where the frequency characteristic in the intermediate frequency band is flat (FIG. 2A), increasing but having an intermediate notch (FIG. 2B) or decreasing but having an intermediate notch (FIG. 2C). The controller 26 performs phase control in such a manner that the frequency characteristics of FIGS. 2B and 2C will become the frequency characteristic shown in FIG. 2A. More specifically, the controller 26 performs phase control so as to minimize the slope SL, which is the difference between the level of the high-frequency side and the level of the low-frequency side, and minimize notch depth ND, which is the difference between the center frequency level and a set level Ls.

Figure 2A:
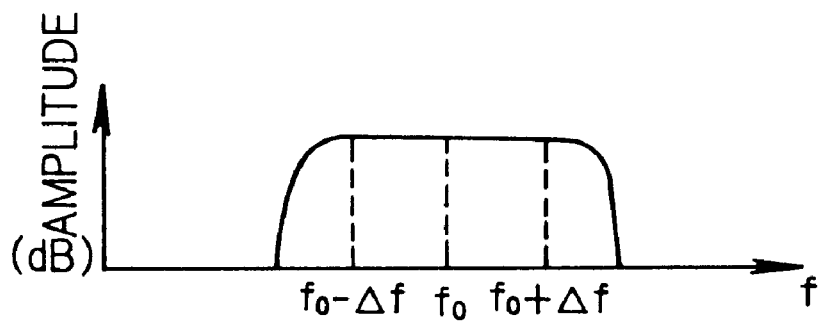
FIGS. 2A through 2C are diagrams useful in describing frequency characteristics within a band.

The detector 25 has an AD converter (ADC) 31 for sampling a combined signal SD at a frequency which is n (e.g. four) times the center frequency $f_0$ of the intermediate frequency band and converting the combined signal SD from an analog quantity to a digital value, and digital detection units 32, 33, 34 for digitally detecting the center frequency component, high-frequency side component and low-frequency side component using the digital data output by the AD converter 31, the digital detector being constituted by a digital bandpass filter for outputting each frequency component, and a digital rectifier circuit.

(b) Phase control processing by controller

FIG. 3 is a flowchart of phase control processing executed by the controller 26.

Upon receiving a center frequency component SDA, high-side frequency component SDB and low-side frequency component SDC from the digital detection units 32, 33 and 34, respectively, the controller 26 calculates notch depth ND(n), which is the difference between the center frequency component SDA and the set level Ls, and slope SL(n), which is the difference (SDC–SDB) between the level of the high-side frequency and the level of the low-side frequency. Next, the controller 26 compares the value of notch depth ND(n) with the value of the immediately preceding notch depth ND(n-1) (step 101). If ND(n)>ND(n-1) holds, signifying that the current notch depth is larger, this means that the direction of phase advance/delay control is the opposite of that in the immediately preceding phase control. Accordingly, the phase is changed by a predetermined angle Δθ (step 102) in the direction opposite the immediately preceding control direction, after which processing returns. Here Δθ is equal to, say, 1.4° (=360°/$2^8$).

If ND(n)≦ND(n-1) holds, on the other hand, the controller 26 determines whether ND(n)<ND(n-1) holds (step 103). If ND(n)<ND(n-1) holds, this means that the phase advance/delay control direction which prevailed in the immediately preceding phase control operation was correct. Accordingly, the phase is changed by the predetermined angle Δθ (step 104) in the same direction as the immediately preceding control direction, after which processing returns.

If the decision rendered at step 103 is that ND(n)=ND(n-1) holds, the controller 26 compares the value of slope SL(n) and the value of the immediately preceding slope SL(n-1) (step 105). If SL(n)>SL(n-1) holds, signifying that the current slope is larger, this means that the direction of phase advance/delay control is the opposite of that which prevailed previously. Accordingly, the phase is varied by the predetermined angle $\Delta\theta$ (step 106) in the direction opposite the immediately preceding control direction, after which processing returns.

If SL(n)≦SL(n-1) is found to hold at step 105, on the other hand, this means that the phase advance/delay control direction which prevailed in the immediately preceding phase control operation was correct. Accordingly, the phase is varied by the predetermined angle $\Delta\theta$ (step 104) in the same direction as the immediately preceding control direction, after which processing returns. If the foregoing control is repeated, the relations ND(n)≈0, SL(0)≈0 will eventually be attained.

(c) Construction of detector

FIG. 4 is a block diagram of the digital detector 25. The AD converter (ADC) 31 samples the combined signal SD at a frequency which is n (e.g. four) times the center frequency $f_0$ and converts the combined signal SD from an analog quantity to a digital value. The digital detection units (DFT) 32, 33 and 34 digitally detect the combined signal of the center frequency (intermediate frequency) $f_0$, the frequency $f_0+\Delta f$ on the high side and the frequency $f_0-\Delta f$ on the low side, respectively, using the digital data output by the AD converter 31. The detection units 32–34, each of which has the same construction in terms of a block diagram, have (1) a digital bandpass filter 35 for outputting the frequency components $f_0$, $f_0+\Delta f$ and $f_0-\Delta$, respectively, and a digital rectifier circuit 36 for rectifying the output of the bandpass filter. The rectifier circuit 36 has a peak holding circuit PKH for holding the peak value of the bandpass filter output, and an averaging circuit (integrator) MNC for integrating and averaging the output of the peak holding circuit. Alternatively, the rectifier circuit 36 may have an absolute value circuit ABS for calculating the absolute value of the bandpass filter output, and an averaging circuit MNC for averaging the absolute value.

(c-1) Detection unit for center frequency $f_0$

The bandpass filter 35 of the digital detection unit 32 for the center frequency $f_0$ is constituted by a selector SL for extracting digital data, every n items thereof, output from the AD converter 31 at a speed of n·$f_0$, and an integrator ITG for digitally integrating the output of the selector SL. If n=4 holds and the items of sampling data output by the AD converter 31 at the speed 4·$f_0$ are A, B, C, D, A, B, . . . in succession (see FIG. 5), then the selector SL will extract and output the sampling data every four items of data. That is, the selector SL extracts the sampling data A at the center frequency $f_0$, as illustrated at (a) in FIG. 5, and enters this data into the integrator ITG. The integrator ITG integrates the input data and outputs the average value thereof.

Figure 6:
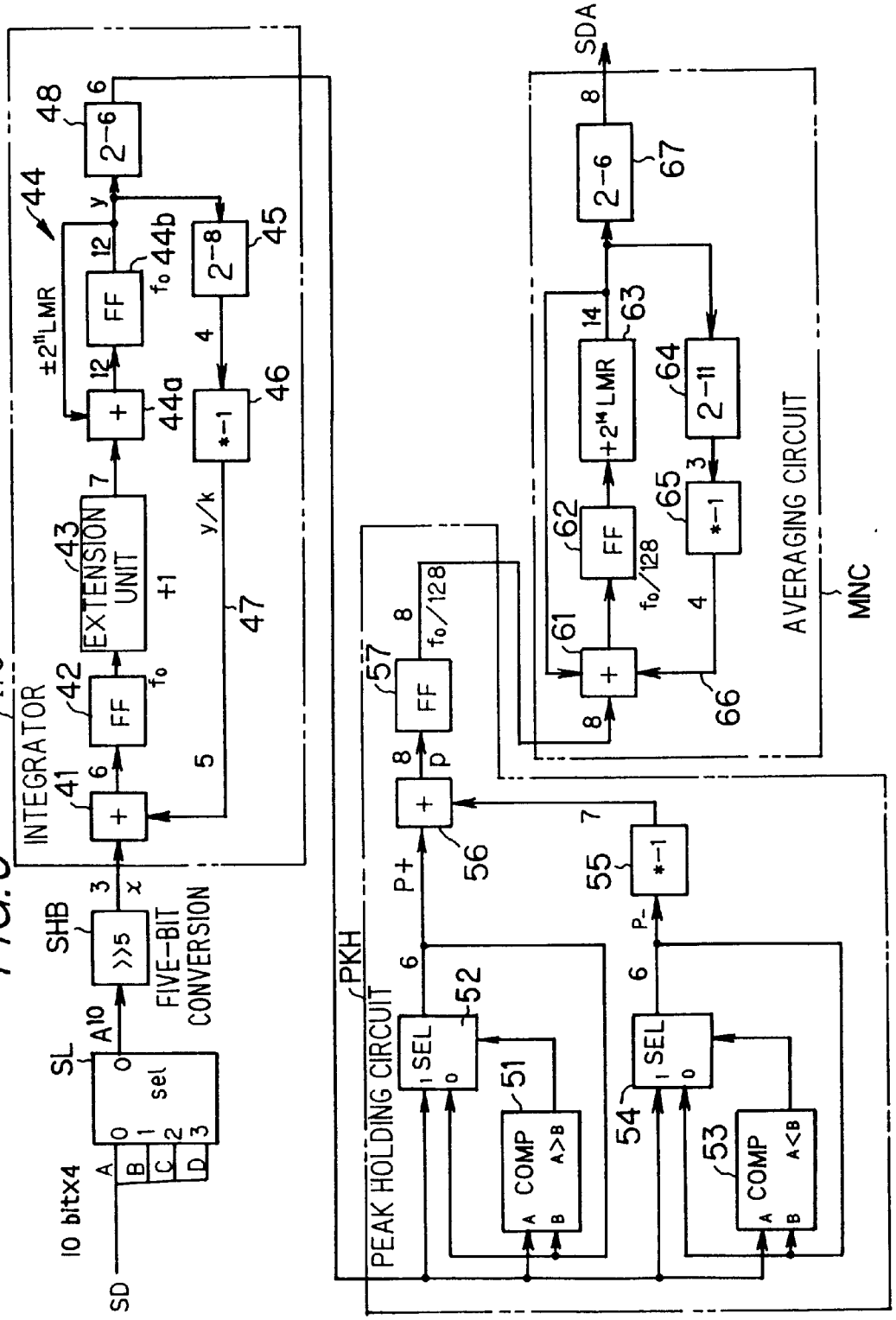
FIG. 6 is a block diagram showing the construction of a center frequency sensor.

FIG. 6 is a block diagram of the digital detection unit 32 for the center frequency $f_0$. The selector SL extracts and outputs the data A, every four times of data, from a 10-bit sampling data string SD entered at the speed of 4·$f_0$. A 5-bit conversion unit SHB outputs the five higher order bits of the 10-bit data. The integrator, peak holding circuit and averaging circuit are shown at ITG, PKH and MNC, respectively.

The integrator ITG executes the integrating operation at a speed identical with the center frequency $f_0$. The integrator ITG includes an adder 41, a flip-flop 42 for storing a 6-bit output of the adder 41, and an extension unit 43 for adding one "1" bit onto the least significant bit of the 6-bit data, thereby providing 7-bit data. Since the five lower order bits are removed by the five-bit conversion unit SHB, the single bit is added on by the extension unit 3 to reduce error. The integrator ITG further includes an accumulator 44 having an adder 44a for adding the output of the extension unit 43 and an accumulated value, and a 12-bit flip-flop 44b for storing the sum (accumulated value) from the adder 44a. By making the flip-flop 44b a 12-bit flip-flop, the accumulated value is limited to ±$2^{11}$. The integrator ITG further includes a divider 45 for dividing the accumulated value by $2^8$, a signal reversal unit 46, a feedback unit 47, and an output unit 48 for outputting the accumulated value upon dividing it by $2^6$. The integrator ITG executes integration in accordance with the following equation:

$$\int (x-y/k)dt=y$$

where x represents the input, y the output and y/k the feedback value.

The peak holding circuit PKH outputs the peak-to-peak P from a peak value $P_+$ on the plus side to a peak value $P_-$ on the minus side. The peak holding circuit PKH includes a comparator 51 for comparing the value of the current integrated output and plus-side peak value $P_+$ thus far, a selector 52 for selecting whichever is larger and outputting the signal as the peak value $P_+$, a comparator 53 for comparing the value of the current integrated output and minus-side peak value $P_-$ thus far, a selector 54 for selecting whichever is smaller and outputting the signal as the peak value $P_-$, an arithmetic unit 56 for calculating the peak value $P (=P_+ - P_-)$, and a flip-flop 57 for outputting the peak value P at the speed $f_0/128$. That is, the peak holding circuit PKH obtains and outputs the peak value P at a period which is 1/128 of the center frequency.

The averaging circuit MNC executes integration at a speed which is 1/128 of the intermediate frequency $f_0$, averages the peak value P and outputs the result. The averaging circuit MNC includes an adder 61, a flip-flop 62 for storing the output of the adder, a 14-bit accumulated-value storage unit 63 for limiting an accumulated value to +$2^{14}$, a dividing unit 64 for dividing the accumulated value by 2, a sign reversal unit 65, a feedback unit 66 and an output unit 67 for outputting, as detected output data SDA, a value obtained by dividing the accumulated value by $2^6$.

(c-2) Detection unit for high-side frequency ($f_0+\Delta f$)

The bandpass filter 35 (FIG. 4) of the digital detection unit 33 for the high-side frequency ($f_0+\Delta f$) is constituted by the selector SL which, in this case, extracts digital values, every (n-α) number thereof (α≧1), output from the AD converter 31 at a speed of n·$f_0$, and the integrator ITG for digitally integrating the output of the selector SL. If n=4 and α=1 hold and the items of sampling data output by the AD converter 31 at the speed 4·$f_0$ are A, B, C, D, A, B, . . . in succession (see FIG. 5), then the selector SL will extract and output the sampling data every three items of data. That is, the selector SL extracts the sampling data A, D, C, B, A, D at the frequency ($f_0+\Delta f$), as illustrated at (c) in FIG. 5, and enters this data into the integrator ITG. The integrator ITG, which is the next stage, executes integration at the frequency $f_0$. Consequently, in the interval T in which the two items of sampling data A and D are generated within one period, the average value (A+D)/2 of A and D is calculated so that the data which enters the integrator ITG is (A+D)/2, C, B, (A+D)/2, C, . . . in the order mentioned, as indicated at (d) in FIG. 5. The integrator ITG integrates this input data and outputs the average value thereof.

Figure 7:
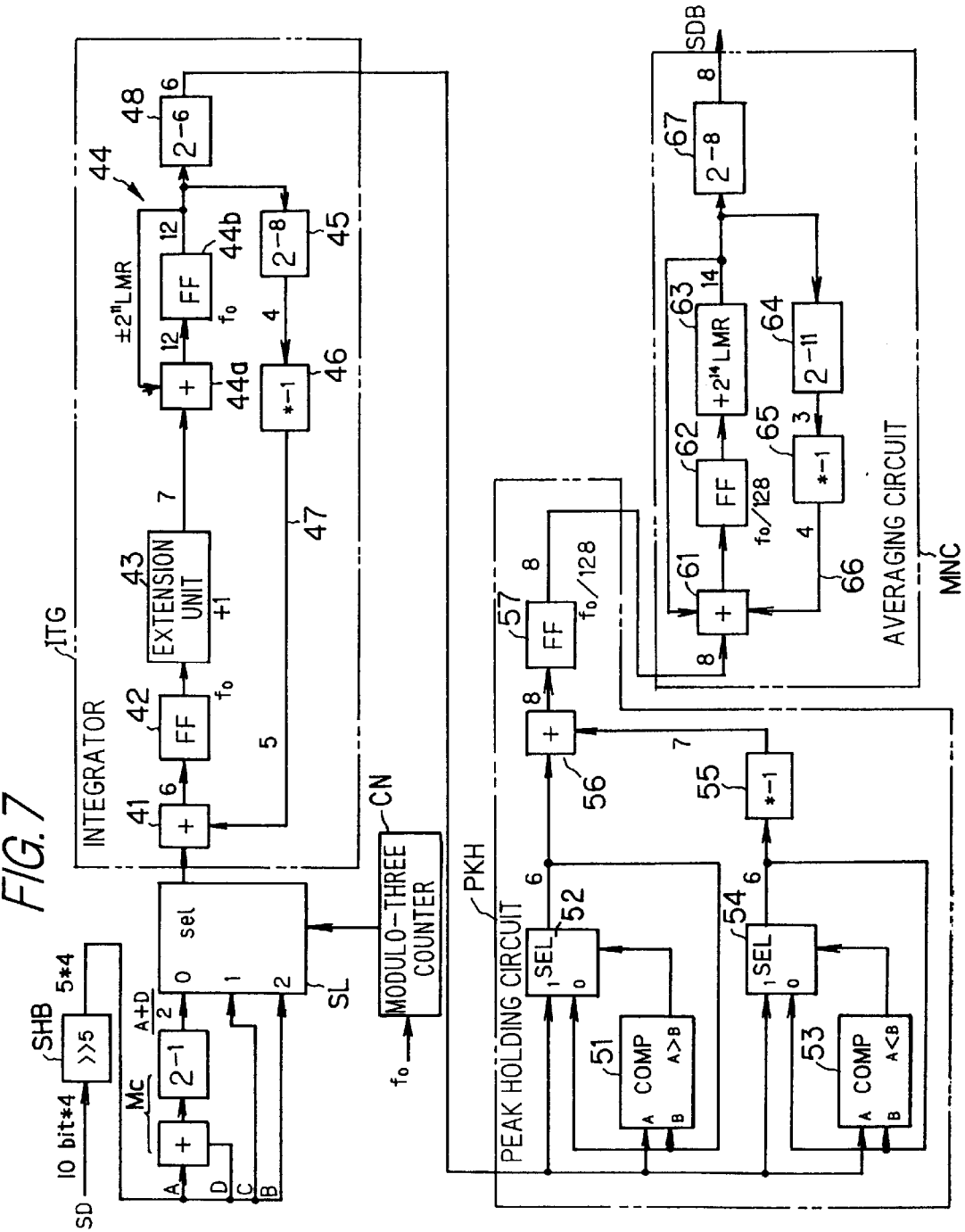
FIG. 7 is a block diagram showing the construction of a high frequency sensor.

FIG. 7 is a block diagram of the digital detection unit 33 for the high-side frequency. Elements identical with those of the detection unit in FIG. 6 are designated by like reference characters. This detection unit differs from that of FIG. 6 in the following respects:

(1) The 5-bit conversion unit SHB which outputs the five higher order bits of the 10-bit sampling data SD is provided at the input.

(2) An arithmetic unit MC calculates the average value (A+D)/2 of the sampling data A, D, which has been converted to five bits, and outputs the result.

(3) The selector SL selects (A+D)/2 and outputs this to the integrator ITG when the count in a modulo-three counter CN is 0, selects C and outputs it to the integrator ITG when the count in counter CN is 1, and selects B and outputs it to the integrator ITG when the count in counter CN is 2.

(4) The output of the averaging circuit MNC is delivered as the high-side detected output data SDB.

(c-3) Detection unit for low-side frequency ($f_0$-Δf)

The bandpass filter 35 (FIG. 4) of the digital detection unit 34 for the high-side frequency ($f_0$-Δf) is constituted by the selector SL which, in this case, extracts digital values, every (n+β) number thereof (β≧1), output from the AD converter 31 at a speed of n·$f_0$, and the integrator ITG for digitally integrating the output of the selector SL. If n=4 and β=1 hold and the items of sampling data output by the AD converter 31 at the speed 4·$f_0$ are A, B, C, D, A, B, in succession (see FIG. 5), then the selector SL will extract and output the sampling data every five items of data. That is, the selector SL extracts the sampling data A, B, C, D, A, B, at the frequency, as illustrated at (b) in FIG. 5, and enters this data into the integrator ITG. The integrator ITG executes integration at the frequency $f_0$. In the interval T', however, no sampling data enters the integrator ITG. In this interval, therefore, the integrator ITG resets the integration operation and does not perform integration.

Figure 8:
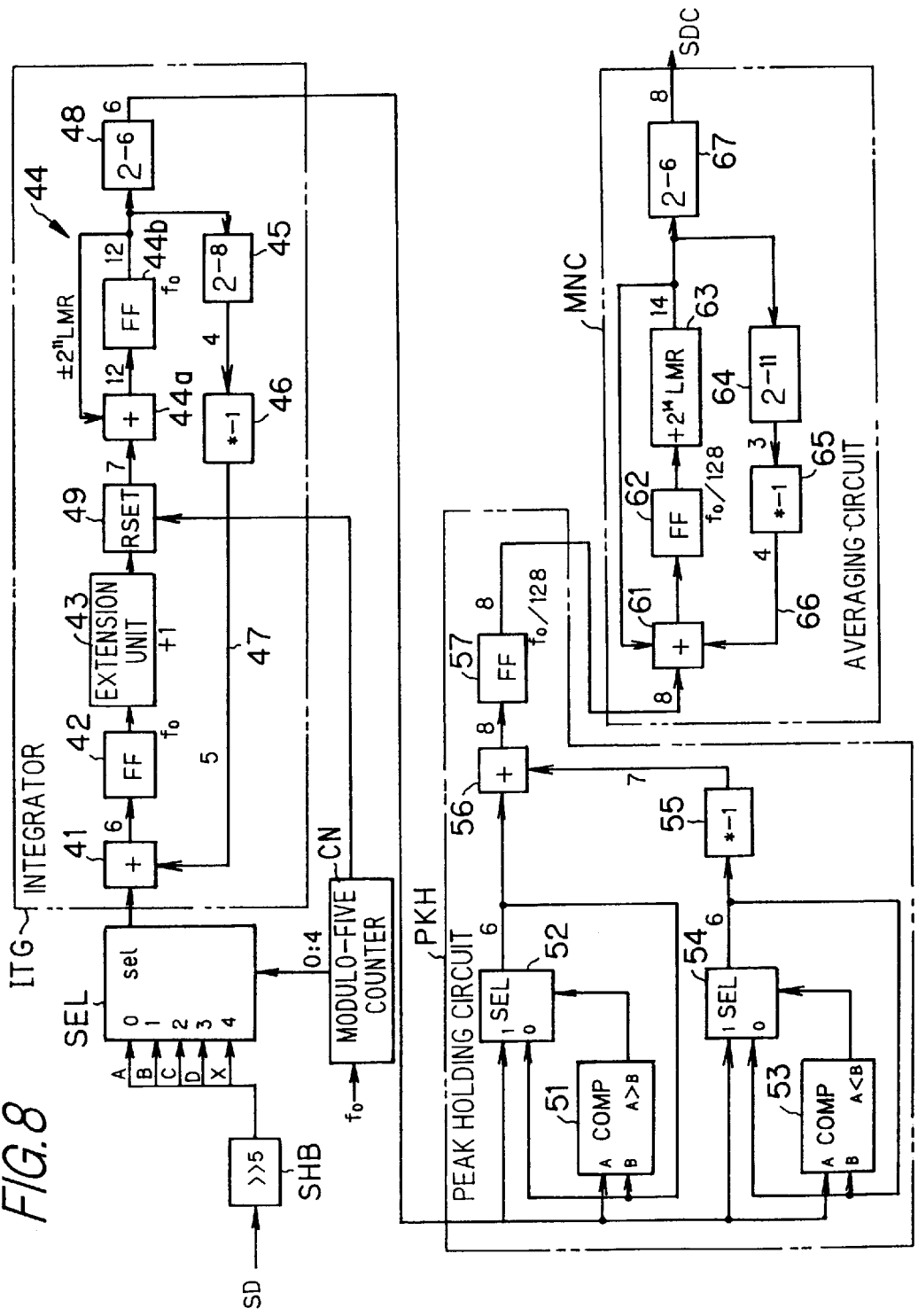
FIG. 8 is a block diagram showing the construction of a low frequency sensor.

FIG. 8 is a block diagram of the digital detection unit 34 for the low-side frequency. Elements identical with those of the detection unit in FIG. 6 are designated by like reference characters. This detection unit differs from that of FIG. 6 in the following respects:

(1) The 5-bit conversion unit SHB which outputs the five higher order bits of the 10-bit sampling data SD is provided at the input.

(2) The selector SL selects, and outputs to the integrator ITG, A when the count in a modulo-five counter CN is 0, B when the counter is 1, C when the count is 2, D when the count is 3 and any numerical value X when the count is 4.

(3) A resetting unit 49 is provided between the extension unit 43 and accumulator 44 of the integrator ITG. When the count in the modulo-five counter CN is 4, the output of the extension unit 43 is reset to 0 and the integration operation is not carried out.

(4) The output of the averaging circuit MNC is delivered as the low-side detected output data SDC.

(d) Effects of digital detector

By constructing the detector 25 from digital components, variance from one apparatus to another is eliminated and the resulting circuitry need not be adjusted. It is unnecessary to construct a bandpass filter by mounting such elements as a coil, capacitor and resistor on a printed circuit board and to construct a rectifier circuit by mounting diodes or the like on a printed circuit board. This makes it possible to realize mounting at higher density and to achieve stable operation. In addition, compensating circuits for temperature and power supply fluctuation are not required. Furthermore, the digital arrangement makes it possible to obtain detected output at high speed. Since phase control is performed so as to establish the relations notch depth ND(n)=0 and slope SL(n)=0, high-speed control becomes possible.

(B) Second Embodiment

In the first embodiment, the items of detected output data SDA, SDB and SDC from the detection units 32, 33 and 34 enter the controller 26 in parallel. Such a parallel data input necessitates a large number of signal lines between the detector 25 and controller 26 and results in a complicated interface. For example, if the detected output data consists of eight bits, 24 signal lines will be required. In accordance with the second embodiment, therefore, the difference between the detected output SDC on the low frequency side and the detected output SDB on the high frequency side is calculated on the detector side, this difference (slope SL) and the detected output SDA of the center frequency are converted to serial data and the serial data are sent to the controller 26 as a bit serial.

Figure 9:
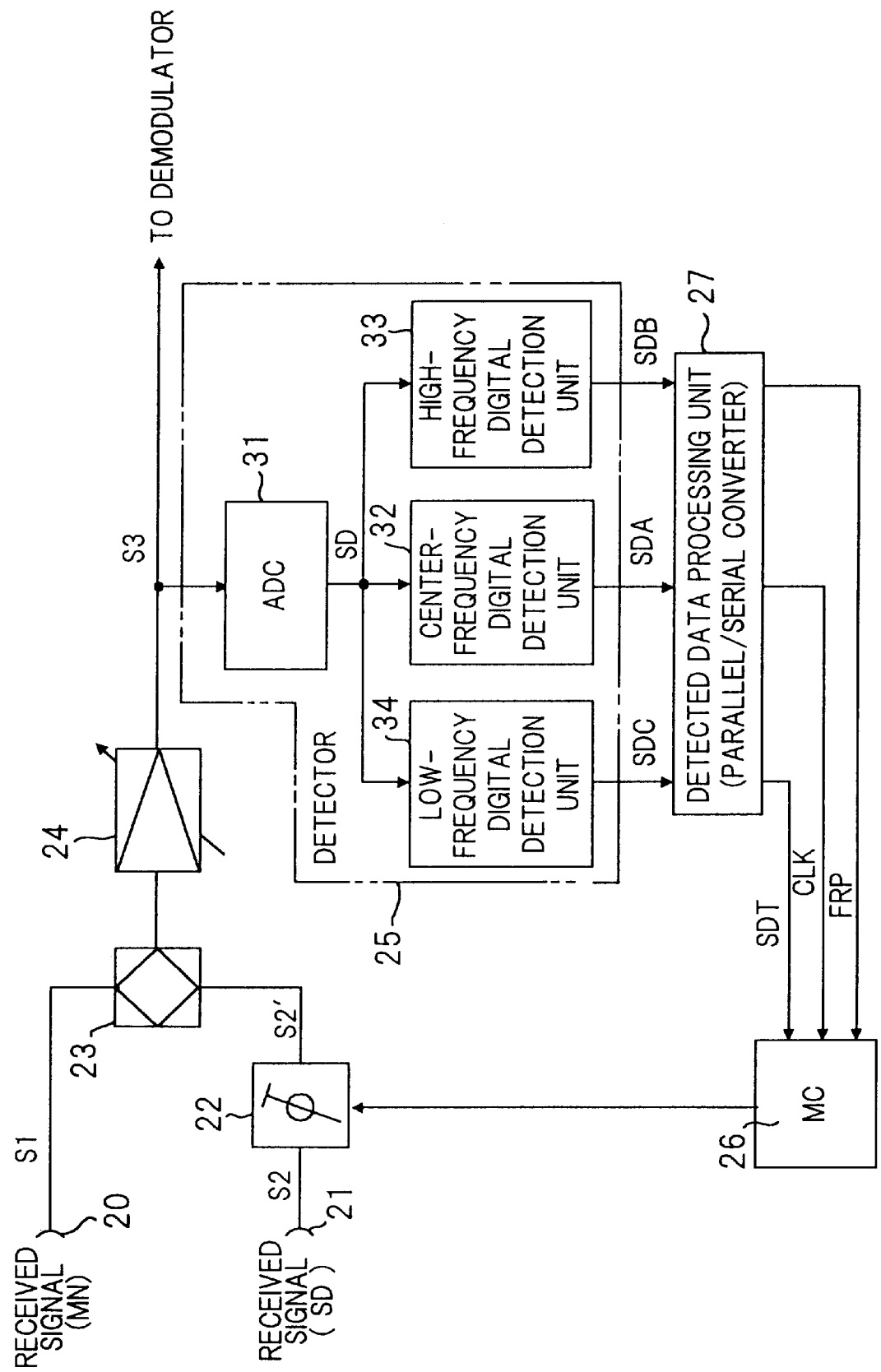
FIG. 9 is a block diagram illustrating a space diversity receiver apparatus according to a second embodiment of the present invention.

FIG. 9 is a block diagram illustrating a space diversity receiver apparatus according to a first embodiment of the present invention. Elements identical with those of the first embodiment in FIG. 1 are designated by like reference characters. This embodiment differs from the first embodiment of FIG. 1 in that a detected data processing unit (parallel/serial converter) 27 is provided between the digital detector 25 and controller 26.

Figure 2B:
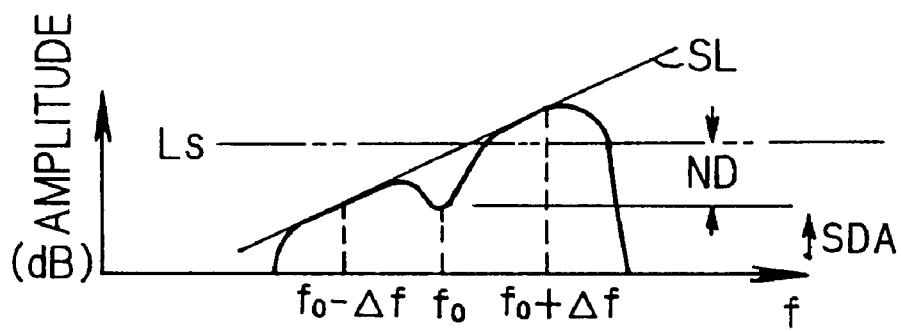
Figure 2C:
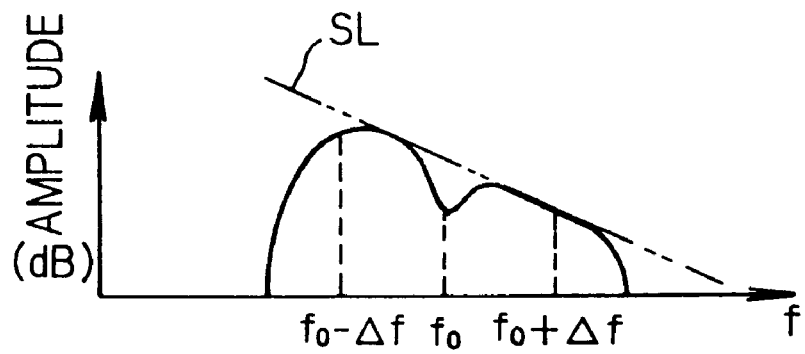
Figure 10:
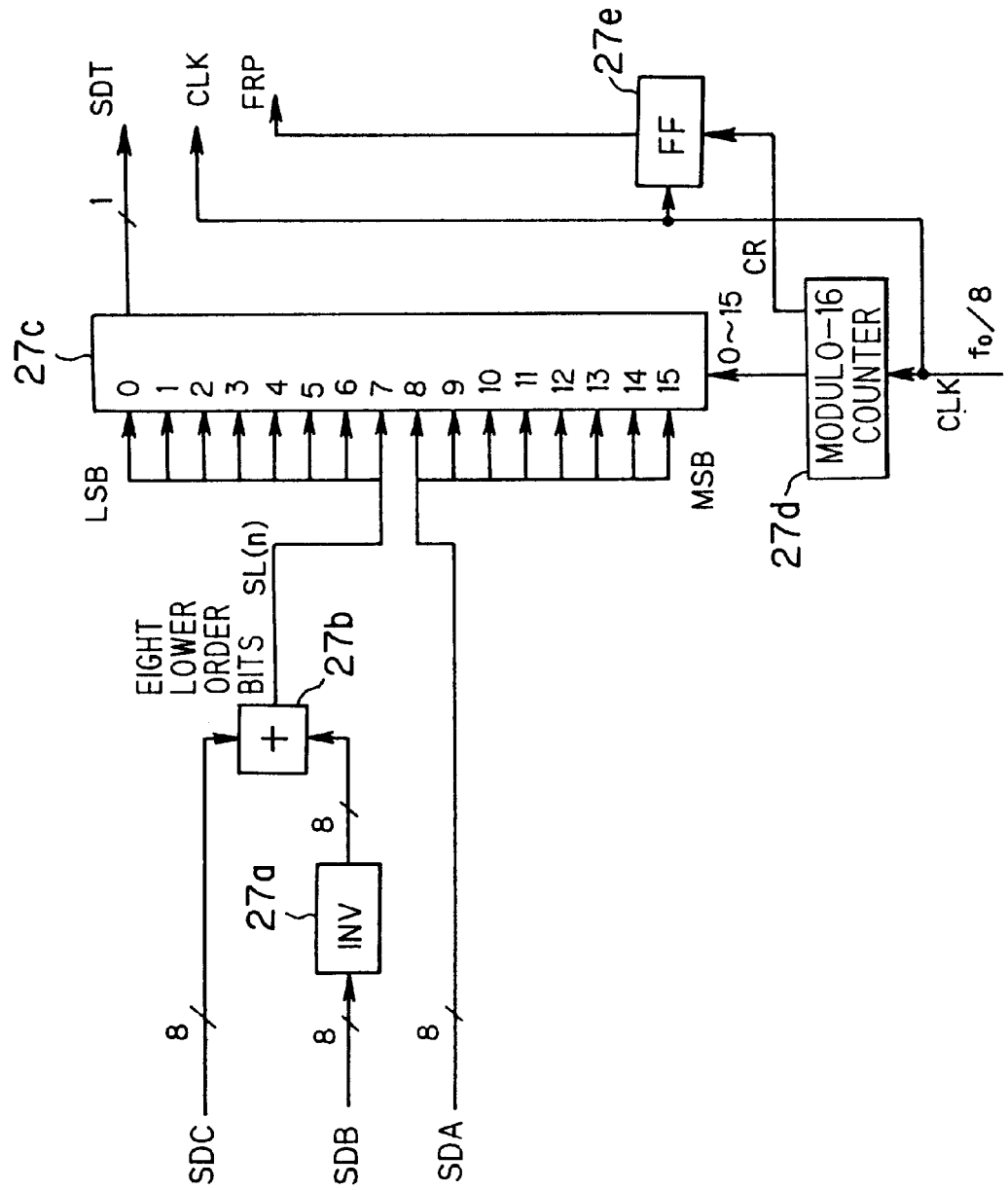
FIG. 10 is a diagram showing the construction of a detected data processing unit (parallel/serial converter)

FIG. 10 is a diagram showing the construction of the detected data processing unit (parallel/serial converter) 27, which includes a sign reversal unit 27a for reversing the sign of the high-side detected output SDB, and an adder 27b for adding the low-side detected output SDC and the output (-SDB) of the sign reversal unit 27a and outputting the result (SDC–SDB). The difference between the low-side detected output and high-side detected output is the slope SL(n) shown in FIG. 2. A 16-bit register 27c stores the slope SL(n) at the eight lower order bits, stores the detected output SDA at the center frequency $f_0$ at the eight higher order bits and outputs the values of the bits as a bit serial. A modulo-16 counter 27d counts an $f_0$/8 clock signal CLK and outputs a carry signal CR whenever 16 clock signals CLK are generated. A flip-flop 27e reverses state and outputs a frame pulse FRP whenever the carry signal CR enters.

The digital detection units 32, 33 and 34 calculate and deliver the detected outputs SDA, SDB and SDC, respectively, at the speed of $f_0$/128 (see FIGS. 6 through 8). The adder 27b calculates and outputs the slope SL(n) (=SDC–SDB) at the speed of $f_0$/128. The register 27c stores the slope SL(n) and detected output SDA at the speed of $f_0$/128. Meanwhile, the modulo-16 counter 27d counts the $f_0$/8 clock signal CLK and enters its count into the register 27c. The latter successively enters the bit values, which conform to the numerical values 0–15 of the modulo-16 counter 27d, to the controller 26 as serial data SDT in the form of a bit serial. More specifically, the register 27c rewrites the slope SL(n) and detected output SDA at the speed $f_0$/128 and enters the above-mentioned slope SL(n) and detected output SDA into the controller 26 as the serial data SDT in the form of a bit serial. As a result of these operations, the serial data SDT, frame pulse FRP and $f_0$/8 clock signal CLK need only be entered into the controller 26. This makes it possible to reduce the number of signal lines to three.

(C) Third Embodiment

With the minimum amplitude deviation method, the effectiveness of phase control is not achieved if the difference between the reception levels of two antennas is too large. In the prior art, phase control based upon the minimum amplitude deviation method is carried out even in such case. This means that when one of the signal levels recovers to thereby reduce the level difference between the received signals from the two antennas, the combined signal level cannot be enlarged immediately. Accordingly, the third embodiment is so adapted that phase control based upon the minimum amplitude deviation method is performed if the difference between the reception signal levels of the two antennas is less than a set level, phase control is performed so as to maximize the combined signal level if the level difference is equal to or greater than the set level, and it is so arranged that the combined signal level will increase immediately if the level difference becomes too small.

Figure 11:
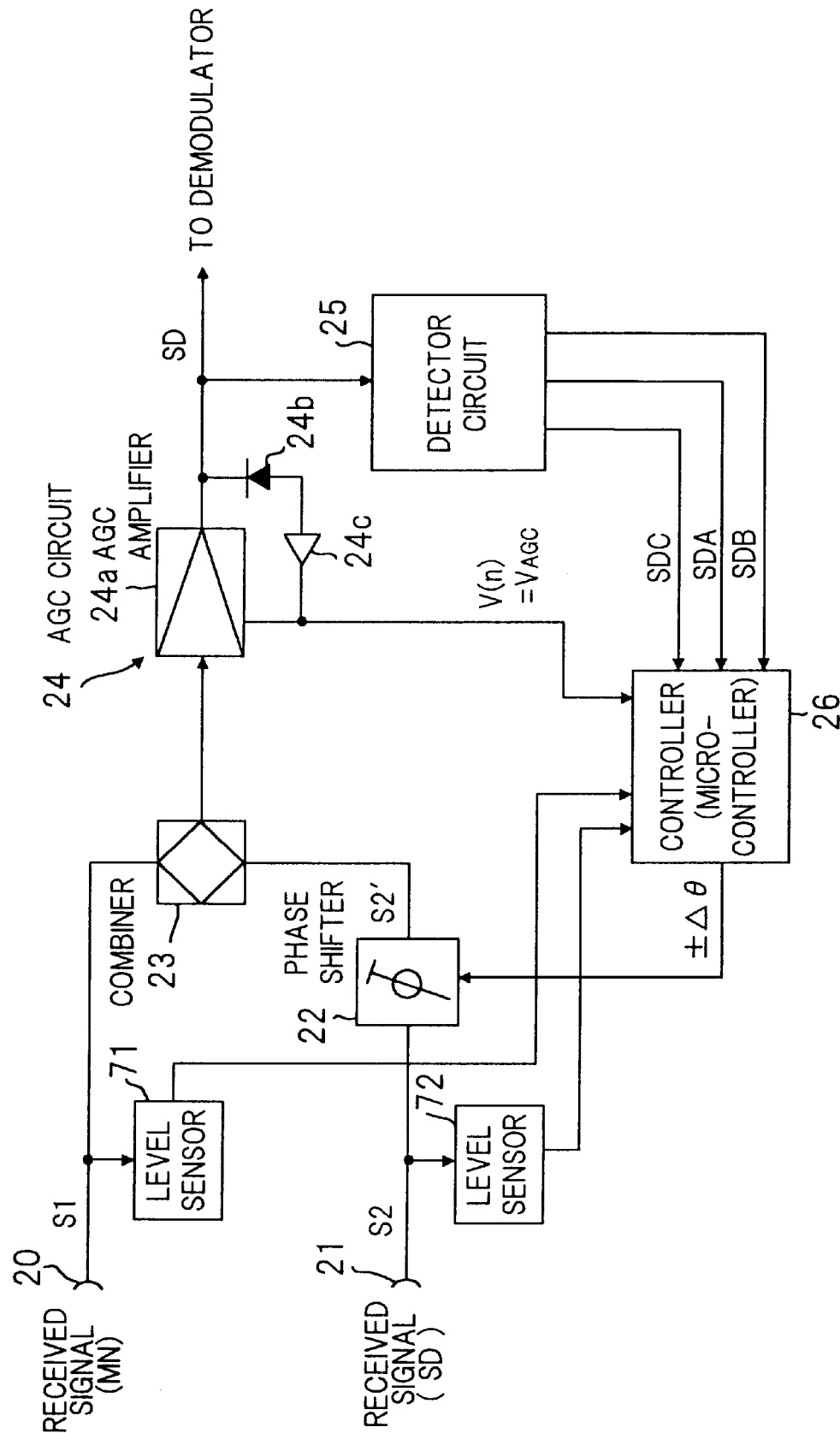
FIG. 11 is a block diagram illustrating a space diversity receiver apparatus according to a third embodiment of the present invention.

FIG. 11 is a block diagram illustrating a space diversity receiver apparatus according to a third embodiment of the present invention. Elements identical with those of the first embodiment in FIG. 1 are designated by like reference characters. This embodiment differs from the first embodiment of FIG. 1 in the following respects:

(1) Reception level sensors 71, 72 are provided for sensing the reception levels or reception powers of the two antennas.

(2) The AGC circuit 24 is constituted by an AGC amplifier 24a, a detector 24b and an operational amplifier 24c.

(3) The AGC voltage $V_{AGC}$ of the AGC circuit 24 enters the controller 26 as the combined signal level V(n) of the combiner 23.

(4) The controller 26 performs phase control based upon the minimum amplitude deviation method if the difference between the reception signal levels of the two antennas is less than a set level, and performs phase control so as to maximize the combined signal level if the level difference is equal to or greater than the set level.

Figure 12:
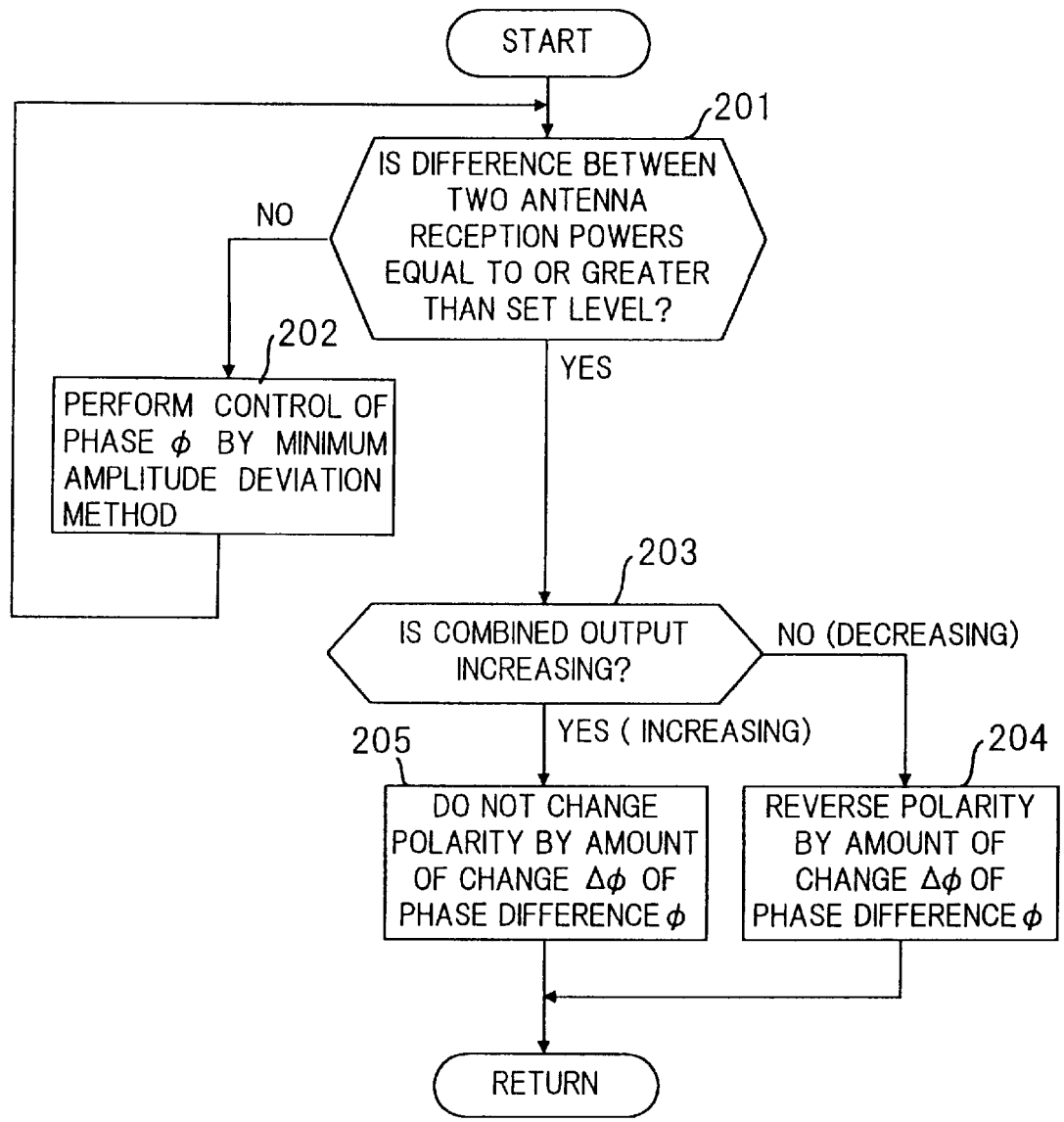
FIG. 12 is a flowchart of phase control processing in a case where the difference between two reception power levels is large.

FIG. 12 is a flowchart of phase control processing performed by the controller 26 according to the third embodiment.

The controller 26 calculates the difference between the two antenna reception levels (reception powers) output by the reception level sensors 71, 72 and determines whether the difference is equal to or greater than the set level (step 201). If the difference is less than the set level, then the controller 26 executes phase control similar to that of the first embodiment shown in FIG. 3, namely phase control based upon the minimum amplitude deviation method (step 202).

If the difference is equal to or greater than the set level, on the other hand, then the controller 26 compares the combined signal value V(n-1) which prevailed one step earlier with the current combined signal value V(n) and determines whether the combined output is increasing (step 203). If V(n)<V(n-1) holds, indicating that the combined output is decreasing, this means that the direction of phase advance/delay control is the opposite of that in the immediately preceding phase control operation. Accordingly, the phase is varied by a predetermined angle $\Delta\theta$ (step 204) in the direction opposite the immediately preceding control direction, after which processing returns. Here $\Delta\theta$ is equal to, say, 1.4° (=360°/$2^8$).

If V(n)$\geq$V(n-1) is found to hold at step S203, indicating that the combined output is increasing, this means that the phase advance/delay control direction which prevailed in the immediately preceding phase control operation was correct. Accordingly, the phase is varied by the predetermined angle $\Delta\theta$ (step 205) in the same direction as the immediately preceding control direction, after which processing returns.

As a result of the foregoing operations, phase control is performed so as to maximize the combined signal level if the difference between the reception signal levels of the two antennas is equal to or greater than a set level. Accordingly, if the difference between the reception signal levels of the two antennas recovers and falls below the set level, the combined signal level can be raised immediately and phase control based upon the minimum amplitude deviation method can be carried out.

(D) Fourth Embodiment

With the minimum amplitude deviation method, opposite phases of the interference components of two received waves are combined and, hence, amplitude deviation can be reduced. However, if there is too much correlation between the interference components of the two received signals, amplitude deviation diminishes but the combined signal level declines, the C/N ratio is degraded and the code error rate is degraded by thermal noise. Accordingly, in the fourth embodiment, the combined signal level is monitored, phase control is performed based upon the minimum amplitude deviation method if the combined signal level is equal to or greater than a set level, and phase control is performed so as to maximize the combined signal level if the combined signal level is less than the set level.

Figure 13:
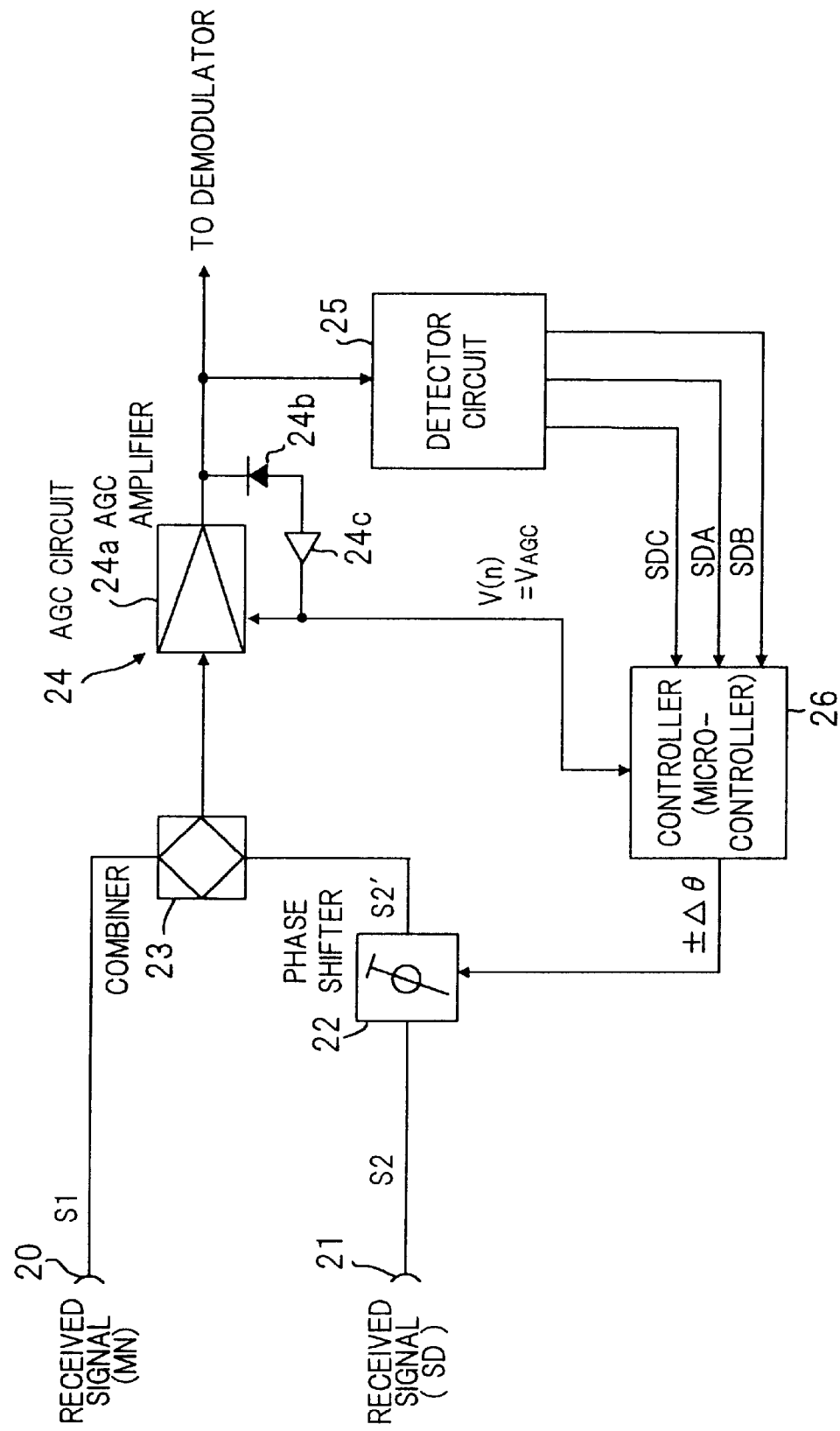
FIG. 13 is a block diagram illustrating a space diversity receiver apparatus according to a fourth embodiment of the present invention.

FIG. 13 is a block diagram illustrating a space diversity receiver apparatus according to a fourth embodiment of the present invention. Elements identical with those of the first embodiment in FIG. 1 are designated by like reference characters. This embodiment differs from the first embodiment of FIG. 1 in the following respects:

(1) The AGC circuit 24 is constituted by the AGC amplifier 24a, a detector 24b and an operational amplifier 24c.

(2) The AGC voltage $V_{AGC}$ of the AGC circuit 24 enters the controller 26 as the combined signal level V(n) of the combiner 23.

(3) The controller 26 performs phase control based upon the minimum amplitude deviation method if the combined signal level is equal to or greater than a set level, and performs phase control so as to maximize the combined signal level if the combined signal level is less than the set level.

Figure 14:
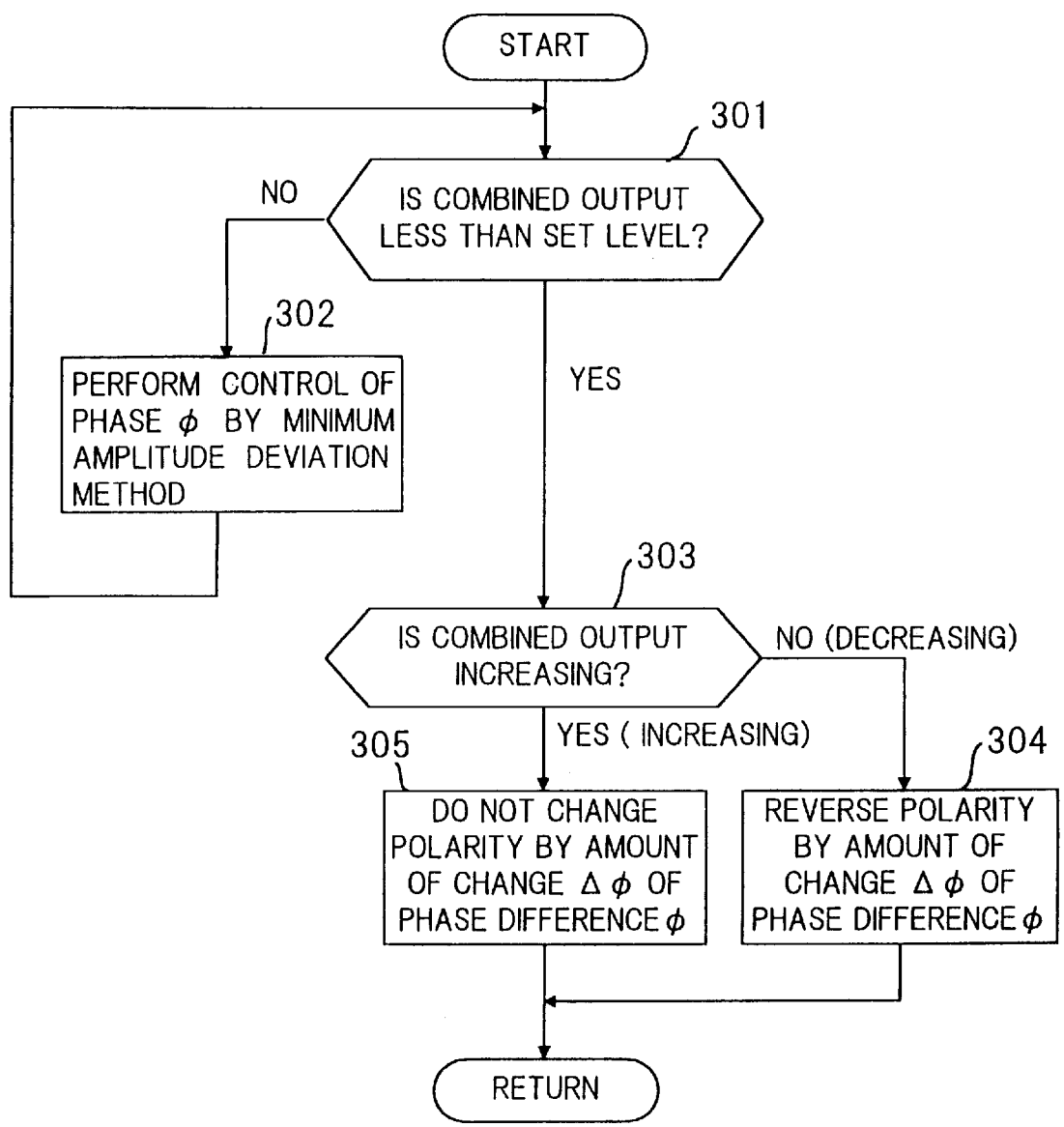
FIG. 14 is a flowchart of phase control processing in a case where a combined output is less than a set level (i.e. a case where there is correlation between two received signals)

FIG. 14 is a flowchart of phase control processing performed by the controller 26 according to the fourth embodiment.

The controller 26 performs monitoring to determine whether the combined signal level V(n) output by the combiner 23 has fallen below the set level (step 301). If the V(n) is equal to or greater than the set level, then the controller 26 executes phase control similar to that of the first embodiment shown in FIG. 3, namely phase control based upon the minimum amplitude deviation method (step 302).

If the combined signal level V(n) is less than the set level, on the other hand, then the controller 26 compares the combined signal value V(n-1) which prevailed one step earlier with the current combined signal value V(n) and determines whether the combined signal level is increasing (step 303). If V(n)<V(n-1) holds, indicating that the combined output is decreasing, this means that the direction of phase advance/delay control is the opposite of that in the immediately preceding phase control operation. Accordingly, the phase is varied by a predetermined angle $\Delta\theta$ (step 304) in the direction opposite the immediately preceding control direction, after which processing returns. Here $\Delta\theta$ is equal to, say, 1.4° (=360°/$2^8$).

If V(n)$\geq$V(n-1) is found to hold at step S303, indicating that the combined output is increasing, this means that the phase advance/delay control direction which prevailed in the immediately preceding phase control operation was correct. Accordingly, the phase is varied by the predetermined angle Δθ (step 305) in the same direction as the immediately preceding control direction, after which processing returns.

As a result of the foregoing operations, phase control is performed so as to maximize the combined signal level if the difference between the reception powers of the two antennas is less than a set level. Accordingly, even if the interference waves of two received signals have a large degree of correlation, it is possible to reduce degradation of the C/N ratio and to improve upon the code error rate.

(E) Fifth Embodiment

In the third embodiment (FIG. 11), phase control based upon the minimum amplitude deviation method is performed in a case where the difference between the reception powers of the two antennas is less than a set value, and phase control is performed so as to maximize the combined signal level in a case where the difference is equal to or greater than the set level. According to the third embodiment, therefore, control is changed over as soon as the difference between the reception powers of the two antennas becomes equal to or greater than the set level. In accordance with the minimum amplitude deviation method, however, amplitude deviation can be reduced. This means that in a case where a fairly good C/N ratio is being obtained, it is desirable to so arrange it that phase control based upon the minimum amplitude deviation method be carried out as much as possible. Accordingly, in the fifth embodiment, the invention is so adapted as to broaden the dynamic range of antenna reception-signal level to which phase control based upon the minimum amplitude deviation method can be applied.

Figure 15:
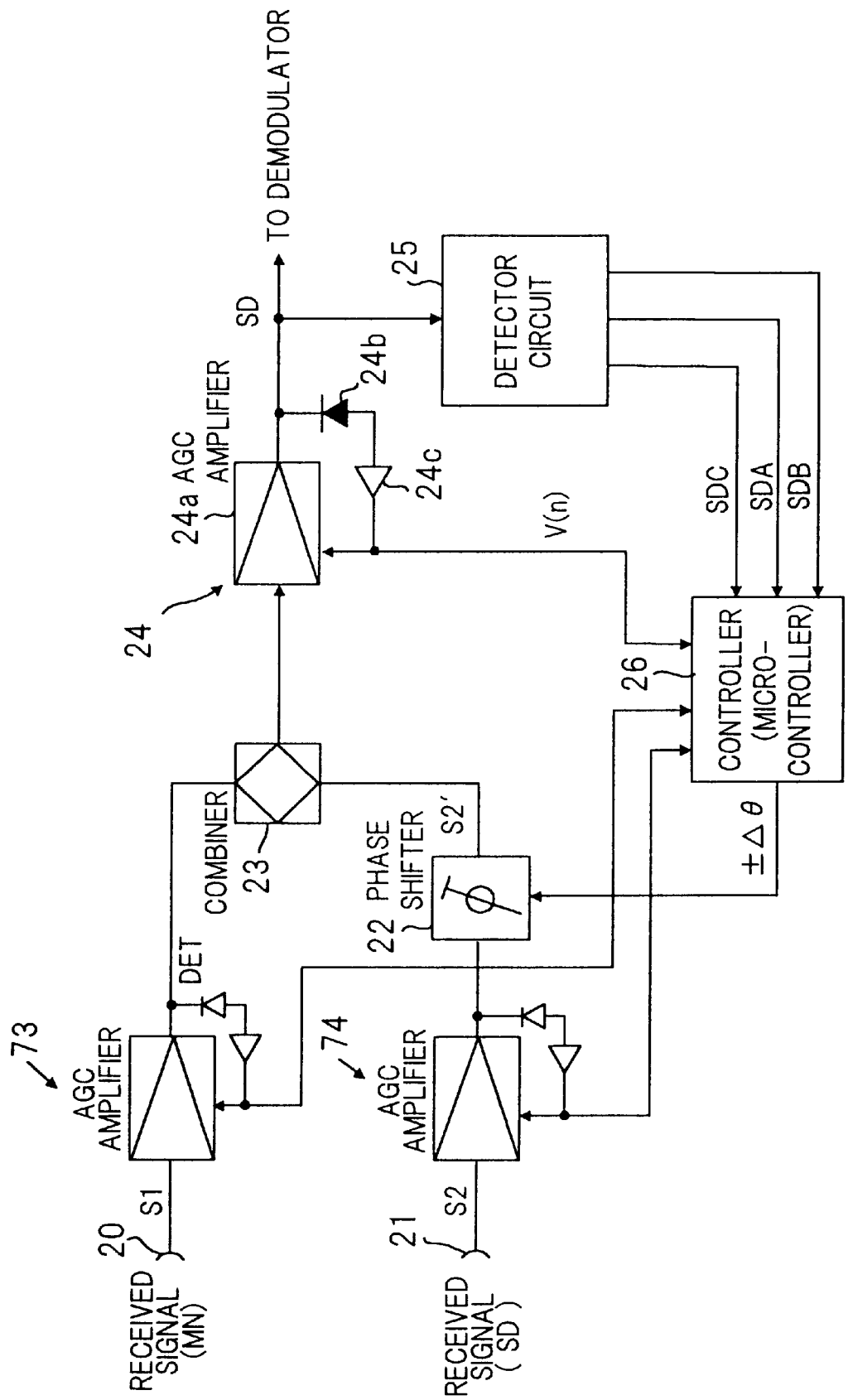
FIG. 15 is a block diagram illustrating a space diversity receiver apparatus according to a fifth embodiment of the present invention.

FIG. 15 is a block diagram illustrating a space diversity receiver apparatus according to a fifth embodiment of the present invention. Elements identical with those of the third embodiment in FIG. 11 are designated by like reference characters. This embodiment differs from the third embodiment of FIG. 11 in the following respects:

(1) The reception level sensors 71, 72 of the third embodiment are eliminated and, in their place, AGC amplifiers 73, 74 are provided for amplifying the antenna reception signals at a predetermined gain, outputting the amplified signals and automatically controlling gain based upon output level. Output level is compressed.

(2) The AGC voltages of the AGC amplifiers 73, 74 are entered into the controller 26 as the reception powers (reception levels) of the respective antennas.

Thus, according to the fifth embodiment, the AGC circuits are provided to compress output level. In other words, AGC control is performed so as to maintain a level suited to phase control based upon the minimum amplitude deviation method. This makes it possible to broaden dynamic range.

(F) Sixth Embodiment

Figure 5:
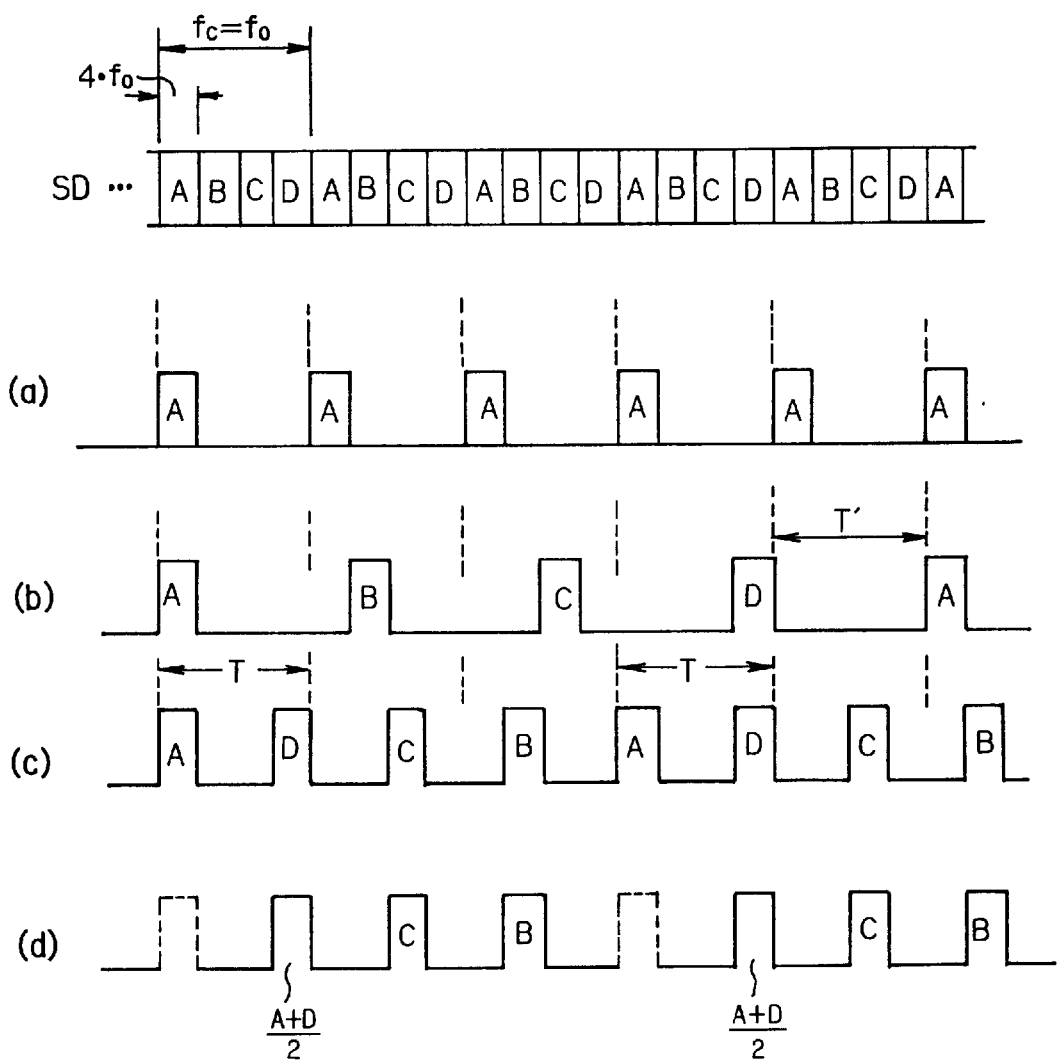
FIG. 5 is a diagram useful in describing the operation of a selector.
Figure 16:
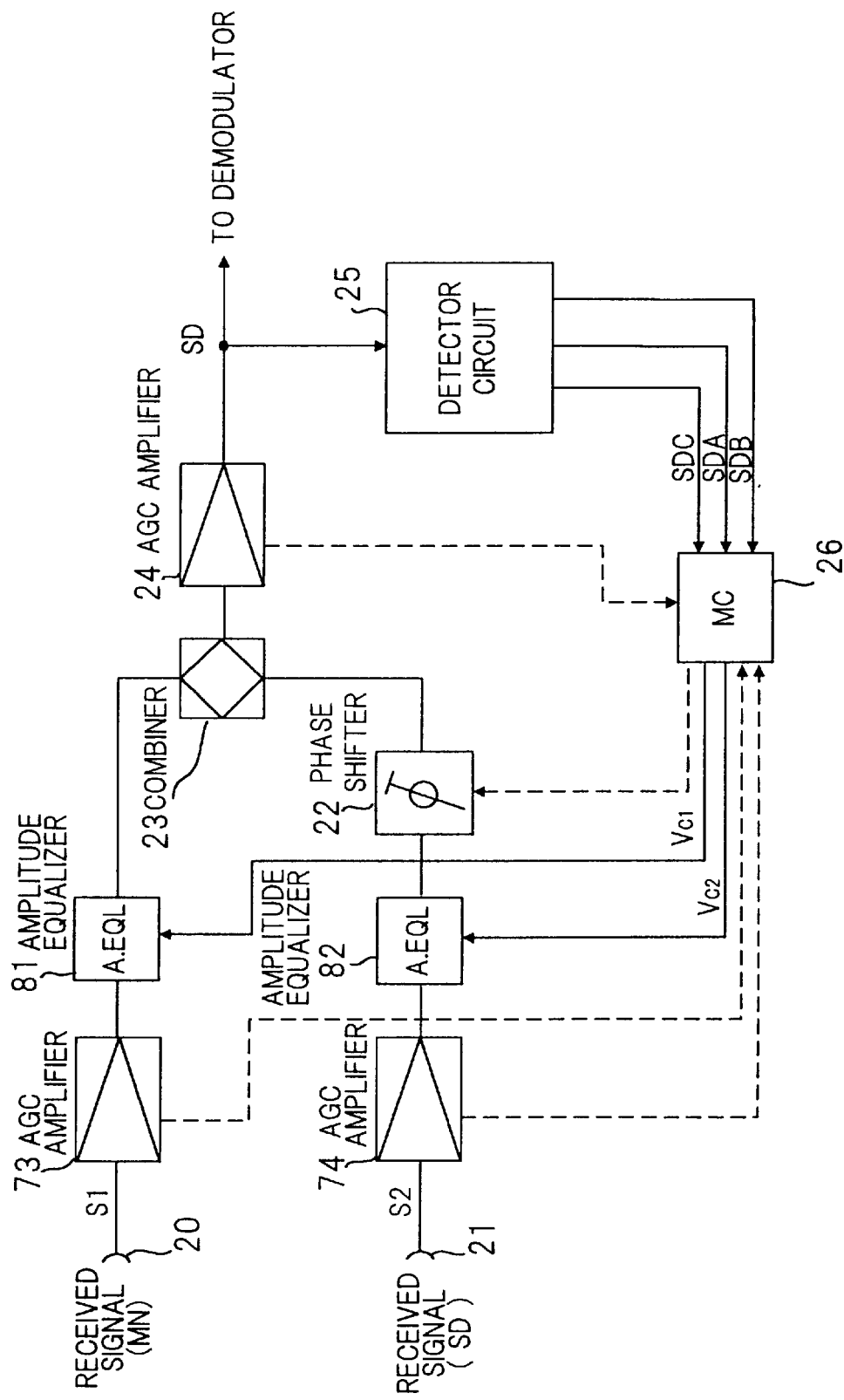
FIG. 16 is a block diagram illustrating a space diversity receiver apparatus according to a sixth embodiment of the present invention.

FIG. 16 is a block diagram illustrating a space diversity receiver apparatus according to a sixth embodiment of the present invention. This is an embodiment for a case in which a variance in amplitude deviation characteristic is reduced so that accurate phase control can be carried out. Elements identical with those of the fifth embodiment in FIG. 5 are designated by like reference characters. This embodiment differs from the fifth embodiment in the following respects:

(1) Amplitude equalizers 81 and 82 are provided between the AGC amplifier 73 and combiner 23 and between the AGC amplifier 74 and phase control circuit 22, respectively.

(2) Initially, control voltages of the amplitude equalizers 81, 82 are obtained so as to flatten the frequency characteristic of each receiving antenna, and the control voltages are input to the amplitude equalizers 81, 82 to effect an initial adjustment.

Figure 17:
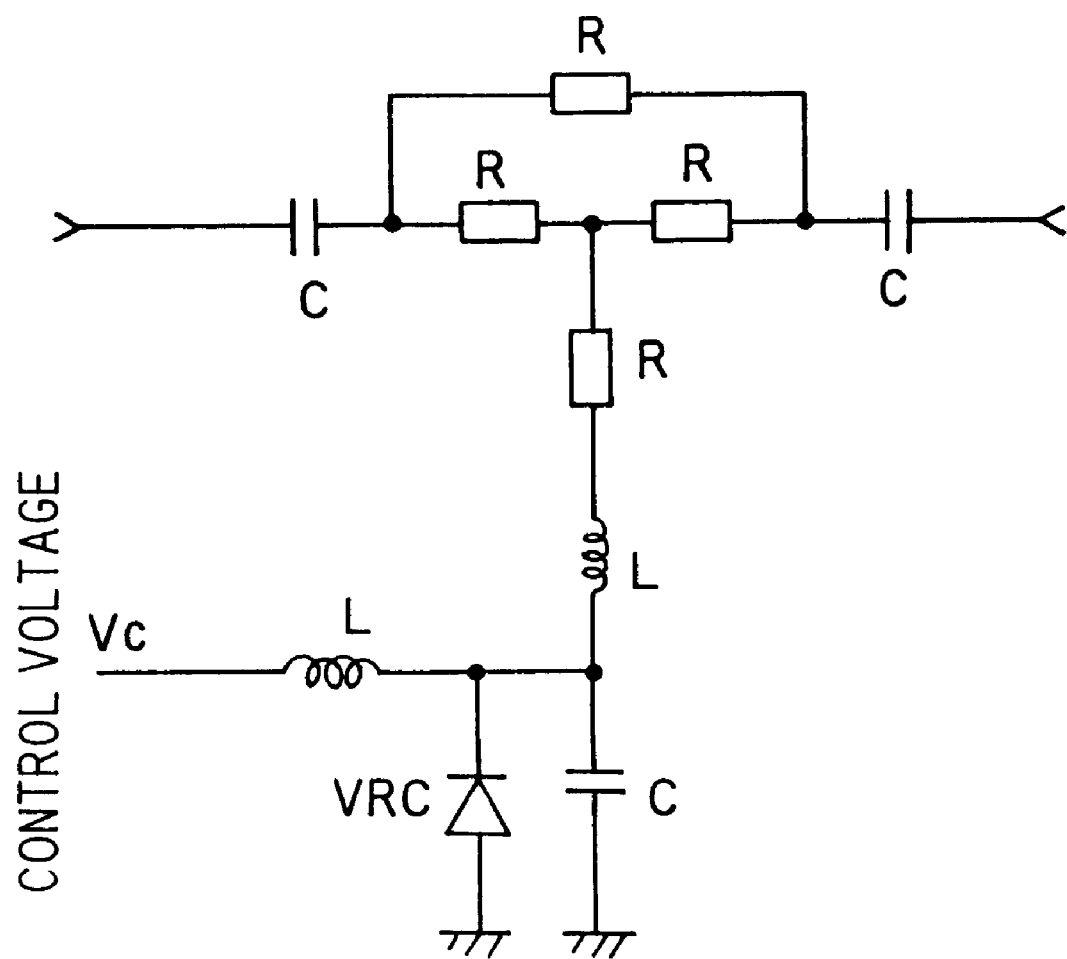
FIG. 17 is a diagram showing the construction of an amplitude equalizer.

FIG. 17 is a diagram of amplitude equalizer construction. The amplitude equalizer includes resistors R, capacitors C, coils L and a variable capacitor VRC the capacitance of which is changed depending upon control voltage Vc.

Assume that the frequency characteristic of the antenna path in the absence of the amplitude equalizer 81 is as shown in (a) of FIG. 18. Then assume that the amplitude equalizer 81 is inserted into above-mentioned antenna path and that the frequency characteristic shown in (b) of FIG. 18 is set in the amplitude equalizer. In such case the overall characteristic will appear as shown in (c) of FIG. 18, thus making it possible to flatten the overall frequency characteristic. Accordingly, with the other antenna output (e.g. intermediate frequency output S2) being held at zero, the controller 26 calculates the slope SL, which is the difference between the detected outputs SDB, SDC on the sides of high and low frequency, respectively, controls the control voltage $Vc_1$ of the amplitude equalizer 81 in such a manner that the slope SL becomes zero, and stores the value of control voltage $Vc_1$ finally obtained. Similarly, with the antenna output (e.g. intermediate frequency output S1) being held at zero, the controller 26 calculates the slope SL, which is the difference between the detected outputs SDB, SDC on the sides of high and low frequency, respectively, controls the control voltage $Vc_2$ of the amplitude equalizer 82 in such a manner that the slope SL becomes zero, and stores the value of control voltage $Vc_2$ finally obtained. When phase control is executed in accordance with the minimum amplitude deviation method under these conditions, the control voltages $Vc_1$, $Vc_2$ that have been stored are applied to the amplitude equalizers 81, 82, respectively.

Thus, the amplitude equalizers 81, 82 are provided, these are adjusted in such a manner that the amplitude deviations in the main signal system of the receiver will become zero initially, and then phase control is carried out. This makes it possible to perform phase control accurately.

Figure 19:
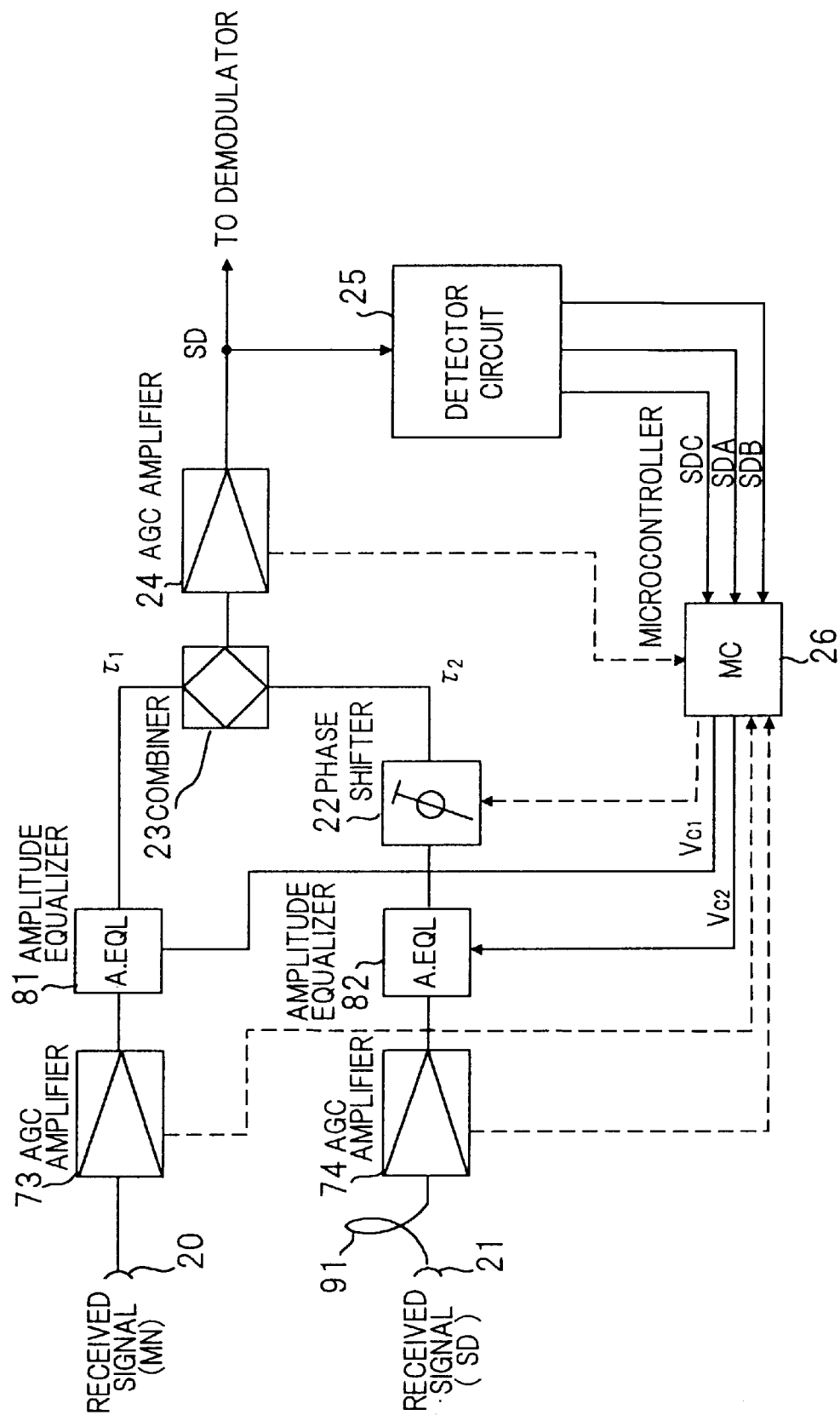
FIG. 19 is a block diagram illustrating the space diversity receiver apparatus according to the sixth embodiment in a case where the apparatus has a delay line.
Figure 20:
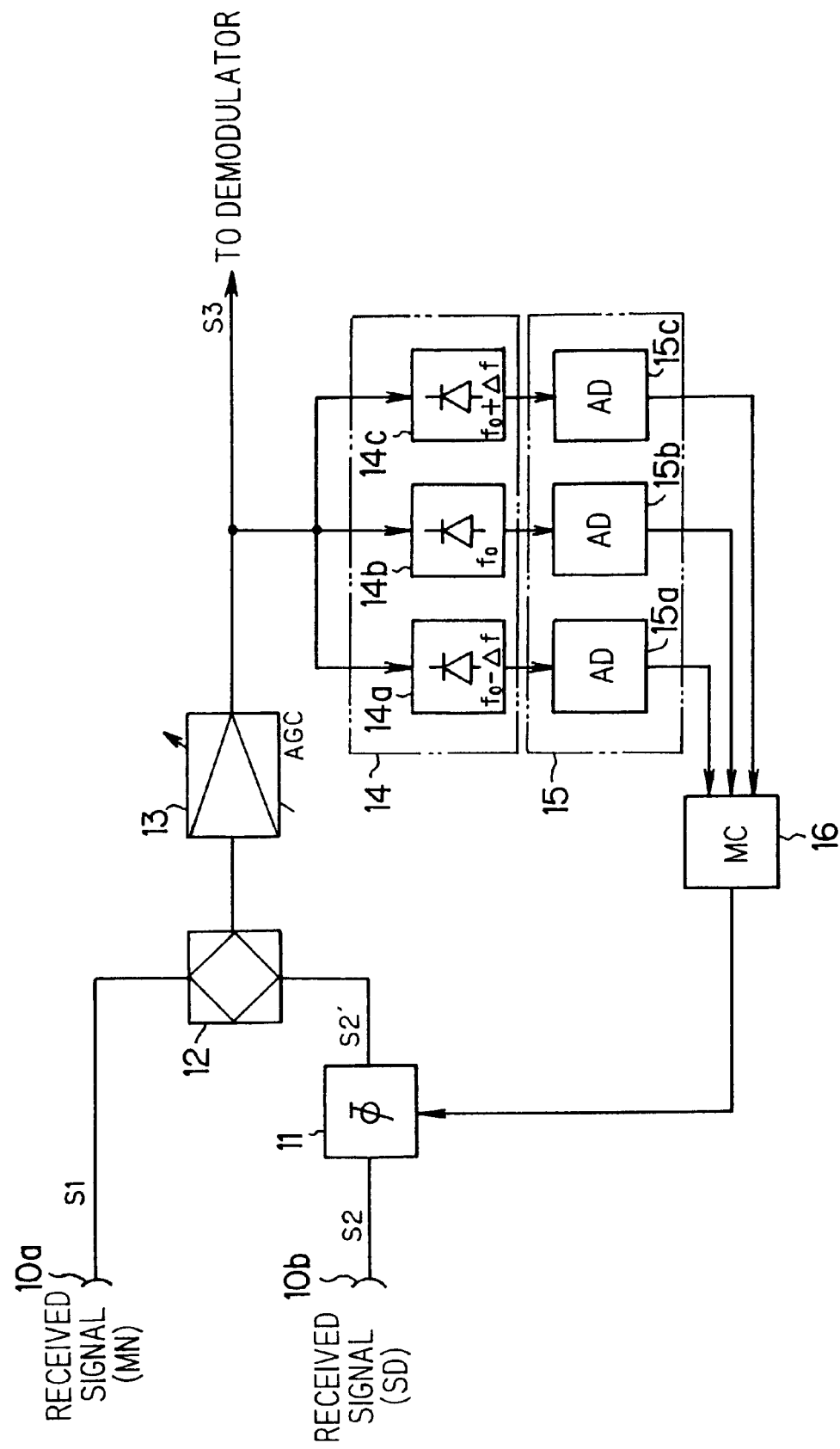
FIG. 20 is a block diagram showing the construction a prior-art space diversity receiver apparatus of the type which applies a minimum amplitude deviation method.
Figure 21A:
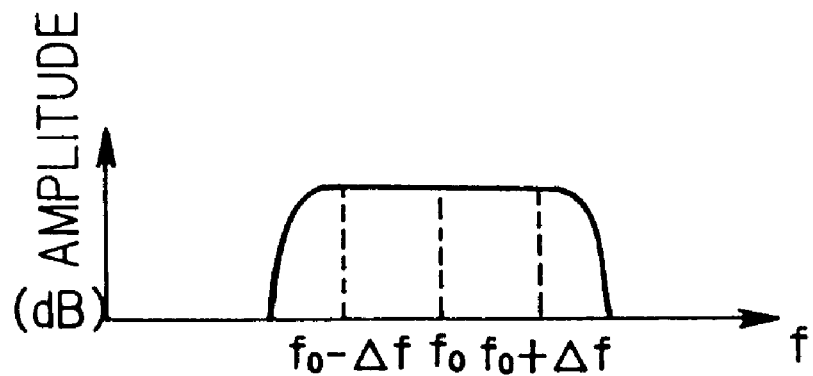
FIGS. 21A through 21C are diagrams useful in describing frequency characteristics within a band.
Figure 21B:
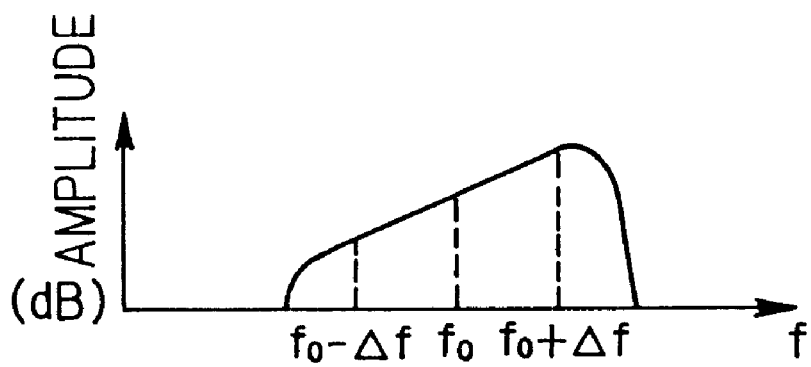
Figure 21C:
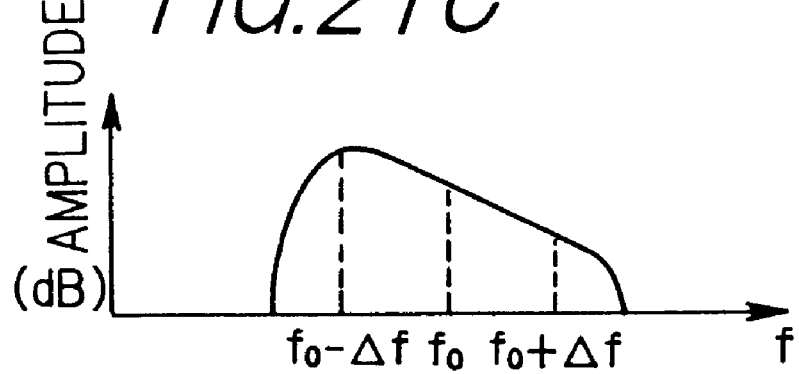
Figure 22:
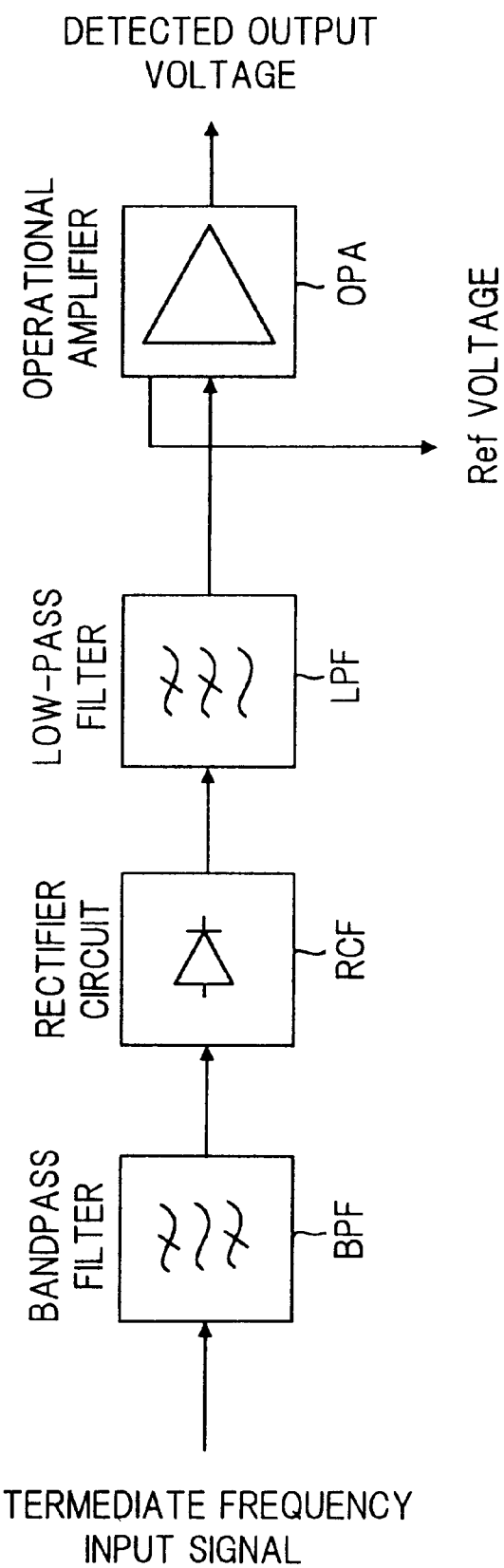
FIG. 22 is a block diagram of an analog detector according to the prior art.
Figure 23:
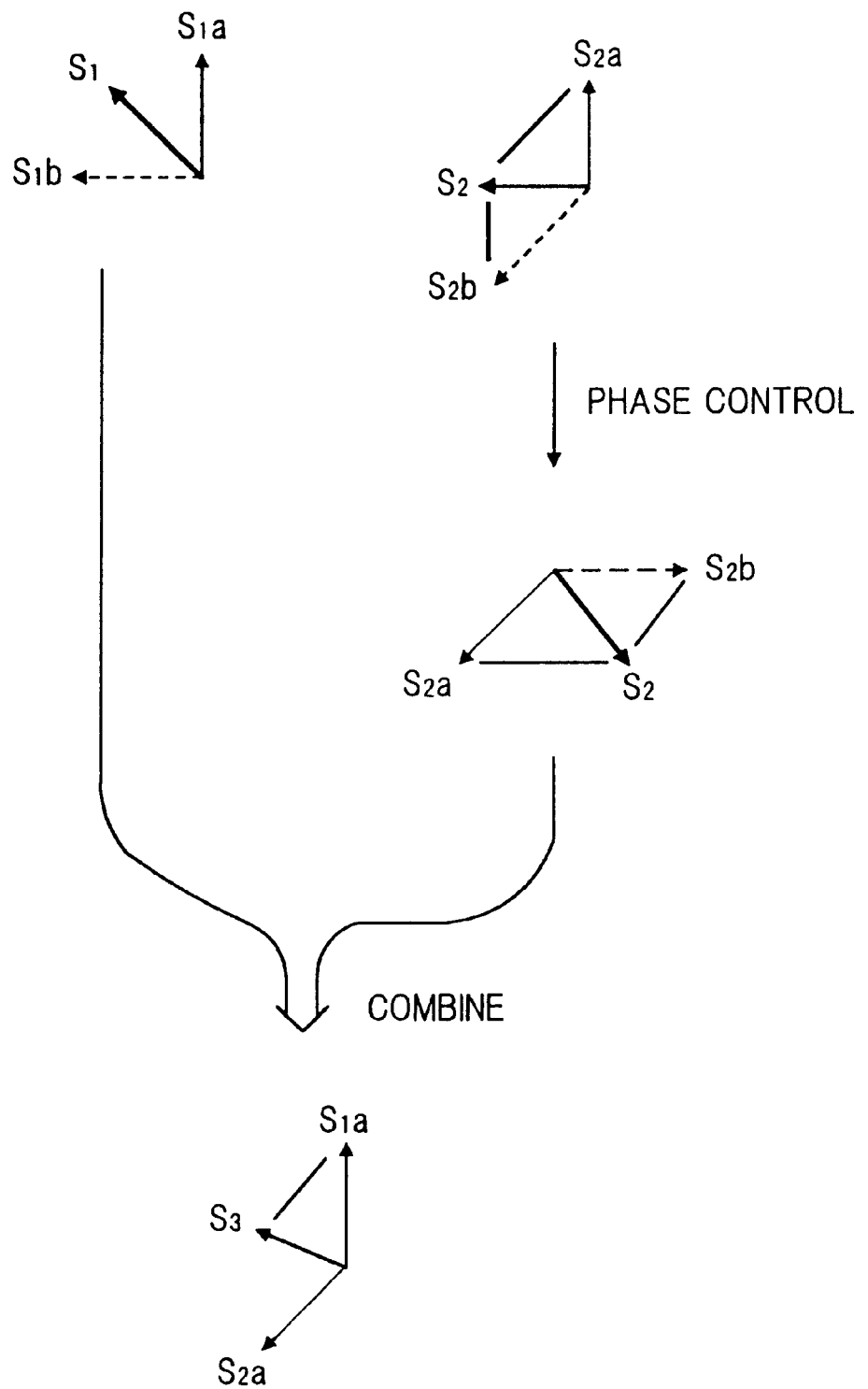
FIG. 23 is a diagram useful in describing a minimum amplitude deviation method.

FIG. 19 shows an example in which the space diversity receiver apparatus of FIG. 16 is provided with a delay line 91 in such a manner that delay times $\tau_1$, $\tau_2$ from the respective antennas to the combiner 23 are rendered identical. Thus, amplitude deviation control using amplitude equalizers can be applied also to a space diversity receiver apparatus equipped with a delay circuit or delay line for phase adjustment.

Thus, in accordance with the present invention as described above, the detector is constructed of digital components, thereby eliminating variance from one apparatus to another and making possible to dispense with circuit adjustments. It is unnecessary to construct a bandpass filter by mounting such elements as a coil, capacitor and resistor on a printed circuit board and to construct a rectifier circuit by mounting diodes or the like on a printed circuit board. This makes it possible to realize mounting at higher density and to achieve stable operation. In addition, compensating circuits for temperature and power supply fluctuation are not required. Furthermore, the digital arrangement makes it possible to obtain detected output at high speed. Since phase control is performed so as to establish the relations notch depth ND(n)=0 and slope SL(n)=0, high-speed control becomes possible.

In accordance with the present invention, it is so arranged that phase control is carried out so as to maximize combined signal level in a case where the difference between the reception signal levels of the two antennas is equal to or greater than a set level. Accordingly, if the difference between the reception signal levels of the two antennas recovers and falls below the set level, the combined signal level can be raised immediately and phase control based upon the minimum amplitude deviation method can be carried out.

In accordance with the present invention, it is so arranged that phase control is carried out so as to maximize combined signal level in a case where the combined signal level is less than the set level. Accordingly, even if the interference waves of two received signals have a large degree of correlation, it is possible to reduce degradation of the C/N ratio and to improve upon the code error rate.

In accordance with the present invention, AGC control is performed so as to maintain a level suited to phase control based upon the minimum amplitude deviation method. This makes it possible to broaden dynamic range.

In accordance with the present invention, amplitude equalizers are provided, these are adjusted in such a manner that amplitude deviations in the main signal system of the receiver will become zero initially, and then phase control is carried out. As a result, variance in the amplitude characteristics of analog circuits is eliminated to make possible highly accurate phase control.

As many apparently widely different embodiments of the present invention can be made without departing from the spirit and scope thereof, it is to be understood that the invention is not limited to the specific embodiments thereof except as defined in the appended claims.

What is claimed is:

1. A space diversity receiver apparatus for receiving signals by two spatially separated antennas, controlling phase of the signal received by one of the antennas, combining the phase-controlled signal and the signal received by the other antenna and outputting the combined signal, comprising:

digital detecting means for digitally detecting center frequency level and levels on high- and low-frequency sides of the center frequency of the combined signal; and phase control means for controlling the phase in such a manner that the center frequency level will coincide with a set level and a deviation between the levels on the high- and low-frequency sides of the center frequency will become zero.

2. The apparatus according to claim 1, further comprising:
means for obtaining a difference between reception signal levels of the two antennas; and
means for executing the phase control if the difference between the reception signal levels is less than a set level, and controlling the phase so as to maximize the combined signal level if the difference between the reception signal levels is greater than the set level.

3. The apparatus according to claim 1, further comprising:
means for monitoring the combined signal level; and
means for executing the phase control if the combined signal level is greater than a set level, and controlling the phase so as to maximize the combined signal level if the combined signal level is less than the set level.

4. The apparatus according to claim 1, further comprising an AGC circuit for compressing output level by applying AGC control to each antenna reception signal.

5. The apparatus according to claim 4, further comprising:
means for obtaining a difference between reception signal levels of the two antennas; and
means for executing the phase control if the difference between the reception signal levels is less than a set level, and controlling the phase so as to maximize the combined signal level if the difference between the reception signal levels is greater than the set level.

6. The apparatus according to claim 1, wherein each antenna has an output path provided with amplitude equalizing means for controlling frequency characteristic of a band from the low- to high-frequency side, said apparatus further comprising:

means for adjusting the amplitude equalizing means provided in one antenna output path, in a state in which the other antenna output has been made zero, in such a manner that the deviation between the levels on the high- and low-frequency sides of the center frequency will become zero.

7. The apparatus according to claim 6, further comprising signal delay means so adapted that signal delay times from respective antennas to a signal combiner are made identical.

8. The apparatus according to claim 1, wherein said digital detecting means includes:

an AD converter for sampling the combined signal at a frequency which is n times a center frequency signal of the combined signal and converting the combined signal from an analog quantity to digital data; and digital detectors for digitally detecting the center frequency component, high-frequency side component and low-frequency side component using the digital data output by said AD converter.

9. The apparatus according to claim 8, wherein each digital detector includes:

a digital bandpass filter for outputting a respective one of the center frequency component, high-frequency side component and low-frequency side component; and a digital rectifier circuit.

10. The apparatus according to claim 9, wherein the bandpass filter that outputs the center frequency component includes:

a selector for extracting the digital data, which is output by the AD converter, every n items of the digital data; and a digital integrator for calculating the difference between the value of the extracted digital data and 1/m of an accumulated value, accumulating this difference and outputting the accumulated value;

the bandpass filter that outputs the high-frequency side component includes;

a selector for extracting the digital data, which is output by the AD converter, every (n-$\alpha$) items of the digital data, where $\alpha \geq 1$ holds; and a digital integrator for calculating the difference between the value of the extracted digital data and 1/m of an accumulated value, accumulating this difference and outputting the accumulated value; and the bandpass filter that outputs the low-frequency side component includes:

a selector for extracting the digital data, which is output by the AD converter, every (n+$\beta$) items of the digital data, where $\beta \geq 1$ holds; and a digital integrator for calculating the difference between the value of the extracted digital data and 1/m of an accumulated value, accumulating this difference and outputting the accumulated value.

11. The apparatus according to claim 9, wherein said digital rectifier circuit includes:

a peak holding circuit for holding a peak value of an output from the bandpass filter; and an integrator for integrating an output from said peak holding circuit.

12. The apparatus according to claim 9, wherein said digital rectifier circuit includes:

an absolute value circuit for calculating an absolute value of an output from the bandpass filter; and an integrator for integrating an output from said absolute value circuit.

13. The apparatus according to claim 1, wherein a parallel/serial converter is provided between said digital detecting means and said phase control means;

said parallel/serial converter converting level deviations between the center frequency level and the levels of the high- and low-frequency sides from parallel data to serial data and entering the serial data into said phase control means as a bit serial.

* * * * *